United States Patent
Wang et al.

(10) Patent No.: US 12,225,408 B2
(45) Date of Patent: Feb. 11, 2025

(54) DATA TRANSMISSION METHOD AND RELATED APPARATUS

(71) Applicant: HUAWEI TECHNOLOGIES CO., LTD., Guangdong (CN)

(72) Inventors: Zhihong Wang, Dongguan (CN); Bo Zeng, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 557 days.

(21) Appl. No.: 17/177,704

(22) Filed: Feb. 17, 2021

(65) Prior Publication Data

US 2021/0176662 A1 Jun. 10, 2021

Related U.S. Application Data

(63) Continuation of application No. PCT/CN2019/102945, filed on Aug. 28, 2019.

(30) Foreign Application Priority Data

Aug. 31, 2018 (CN) .......................... 201811015351.4

(51) Int. Cl.
*H04W 4/00* (2018.01)
*H04L 69/04* (2022.01)
*H04W 28/06* (2009.01)

(52) U.S. Cl.
CPC ............. *H04W 28/06* (2013.01); *H04L 69/04* (2013.01)

(58) Field of Classification Search
None
See application file for complete search history.

(56) References Cited

U.S. PATENT DOCUMENTS 9,084,936 B2 * 7/2015 Perlman ................. H04N 19/61
2007/0070999 A1 3/2007 Black et al.
(Continued)

FOREIGN PATENT DOCUMENTS

CN 101146025 A 3/2008
CN 101197825 A 6/2008
(Continued)

OTHER PUBLICATIONS

Catt, Consideration on Signalling and Procedures for UDC [online], 3GPP TSG RAN WG2 #99bis R2-1710721, Sep. 29, 2017, total 6 pages.

*Primary Examiner* — Zewdu A Beyen
(74) *Attorney, Agent, or Firm* — WOMBLE BOND DICKINSON (US) LLP

(57) ABSTRACT

A data transmission method includes: A transmit end obtains indication information used to indicate that a first compressed packet is lost or fails to be decompressed. The transmit end sends a target original packet or a target compressed packet. The target compressed packet is generated by compressing the target original packet based on a preset compression parameter. The target original packet includes at least one of the following packets: a first original packet corresponding to the first compressed packet, and a second original packet corresponding to a second compressed packet compressed after the first compressed packet. The technical solution provided in this application can improve transmission efficiency that exists when a compressed packet is lost or fails to be decompressed.

13 Claims, 19 Drawing Sheets

(56) References Cited

U.S. PATENT DOCUMENTS

| | | | | |
|---|---|---|---|---|
| 2007/0296822 | A1* | 12/2007 | Lan | H04N 21/440254 |
| | | | | 348/E5.002 |
| 2010/0278271 | A1* | 11/2010 | MacInnis | H04N 19/174 |
| | | | | 375/240.18 |
| 2011/0149790 | A1* | 6/2011 | Mabuchi | H04L 69/04 |
| | | | | 370/216 |

FOREIGN PATENT DOCUMENTS

| | | |
|---|---|---|
| CN | 101841852 A | 9/2010 |
| CN | 107113291 A | 8/2017 |
| CN | 107113667 A | 8/2017 |
| CN | 107172649 A | 9/2017 |
| GB | 2505225 A | 2/2014 |
| JP | 1997224018 | 8/1997 |
| JP | 2009278474 A | 11/2009 |
| JP | 2011223593 A | 11/2011 |
| JP | 2017539152 A | 12/2017 |
| JP | 2021503842 A | 2/2021 |
| WO | 0072486 A1 | 11/2000 |
| WO | 2007091968 A2 | 8/2007 |
| WO | 2016077316 A1 | 5/2016 |
| WO | 2016077762 A1 | 5/2016 |

\* cited by examiner

DATA TRANSMISSION METHOD AND RELATED APPARATUS

CROSS-REFERENCE TO RELATED APPLICATIONS

This application is a continuation of International Application No. PCT/CN2019/102945, filed on Aug. 28, 2019, which claims priority to Chinese Patent Application No. 201811015351.4, filed on Aug. 31, 2018. The disclosures of the aforementioned applications are hereby incorporated by reference in their entireties.

TECHNICAL FIELD

This application relates to the field of communications technologies, and in particular, to a data transmission method and a related apparatus.

BACKGROUND

With rapid growth of user requirements, a communications network needs to transmit more data packets at a higher transmission rate. Therefore, a compressed manner used to transmit data has become a widely used transmission manner currently.

In a process of transmitting data in the compressed manner, a transmit end may compress several original packets (OP) to obtain a compressed packet (CP) corresponding to each original packet, then the transmit end may send several compressed packets to a receive end, and the receive end decompresses each compressed packet to obtain the corresponding original packet.

In some cases, when a compressed packet is lost or fails to be decompressed during transmission, an upper-layer retransmission mechanism of the transmit end is triggered, resulting in a sharp decrease in transmission efficiency.

Currently, a data transmission method that can improve transmission efficiency that exists when a compressed packet is lost or fails to be decompressed is urgently needed.

SUMMARY

This application provides a data transmission method and a related apparatus, to improve transmission efficiency that exists when a compressed packet is lost or fails to be decompressed.

According to a first aspect, this application provides a data transmission method. The method includes:

In a process in which a transmit end sends a compressed packet to a receive end, after compressing original packets to obtain compressed packets, the transmit end sends each compressed packet to the receive end, and buffers the compressed packet and the original packet corresponding to the compressed packet. If a first compressed packet in the compressed packets is lost or fails to be decompressed, the transmit end may obtain indication information used to indicate that the first compressed packet is lost or fails to be decompressed. When the transmit end switches a data transmission manner, the transmit end may send a target original packet or a target compressed packet to the receive end based on a switched transmission manner. The target compressed packet is generated by compressing the target original packet based on a preset compression parameter. The target original packet includes at least one of the following packets: a first original packet corresponding to the first compressed packet, and a second original packet corresponding to a second compressed packet compressed after the first compressed packet.

In an embodiment, if the transmit end switches from sending a packet in a compressed manner to sending a packet in an uncompressed manner, that the transmit end sends the target original packet or the target compressed packet includes: The transmit end sends the target original packet.

In an embodiment, if the transmit end switches from sending a packet in a first compressed manner to sending a packet in a second compressed manner, or the transmit end switches from sending a packet to a source receive end in a compressed manner to sending a packet to a target receive end in a compressed manner, or the transmit end enters a state of enabling the preset compression parameter to send a packet, that the transmit end sends the target original packet or the target compressed packet includes: The transmit end sends the target compressed packet.

When the transmit end uses a compressed manner with an association feature before switching the data transmission manner, a compressed packet compressed later needs to be decompressed based on a compression parameter corresponding to a compressed packet compressed earlier. When the first compressed packet is lost or fails to be decompressed, if the transmit end retransmits the compressed packet compressed before the data transmission manner is switched, the receive end cannot decompress the compressed packet retransmitted by the transmit end. This is because after the data transmission manner is switched, the receive end does not store a compression parameter of a compressed packet decompressed before the data transmission manner is switched. According to the data transmission method provided in this application, the transmit end may send the target original packet or the target compressed packet based on a transmission manner obtained after the data transmission manner is switched. The target compressed packet may be generated by compressing the target original packet based on the preset compression parameter. Because the receive end can directly receive the target original packet, or can decompress, based on the preset compression parameter learned in advance, any compressed packet compressed after the data transmission manner is switched, a problem that a transmission rate decreases because the transmit end triggers upper-layer retransmission can be avoided.

In an embodiment, if the target original packet includes the first original packet, the target compressed packet includes a third compressed packet. The third compressed packet is generated by compressing the first original packet based on the preset compression parameter.

In an embodiment, if the target original packet includes the second original packet, the target compressed packet includes a fourth compressed packet. The fourth compressed packet is generated by compressing the second original packet based on the preset compression parameter.

In an embodiment, if the target original packet includes the first original packet and the second original packet, the target compressed packet includes a third compressed packet and a fourth compressed packet. The third compressed packet is generated by compressing the first original packet based on the preset compression parameter, the fourth compressed packet is generated by compressing the second original packet based on a compression parameter corresponding to the third compressed packet, and the compression parameter corresponding to the third compressed packet is generated by updating the preset compression parameter based on the first original packet.

In an embodiment, after the transmit end switches from sending a packet in a first compressed manner to sending a packet in a second compressed manner, or the transmit end switches from sending a packet to a source receive end in a compressed manner to sending a packet to a target receive end in a compressed manner, or the transmit end enters a state of enabling the preset compression parameter to send a packet, the method further includes: The transmit end sends a third original packet. The transmit end sends a fifth compressed packet. The fifth compressed packet is generated by compressing the third original packet based on the preset compression parameter, or the fifth compressed packet is generated by compressing the third original packet based on a compression parameter corresponding to the fourth compressed packet. The compression parameter corresponding to the fourth compressed packet is generated by updating the preset compression parameter based on the second original packet.

In an embodiment, the first compressed packet is generated by compressing the first original packet based on a compression parameter corresponding to a sixth compressed packet compressed before the first compressed packet.

In an embodiment, the second compressed packet is generated by compressing the second original packet based on a compression parameter corresponding to the first compressed packet. The compression parameter corresponding to the first compressed packet is generated by updating, based on first original packet, the compression parameter corresponding to the sixth compressed packet compressed before the first compressed packet; or the compression parameter corresponding to the first compressed packet is the preset compression parameter.

In an embodiment, the data transmission method provided in this application may be further used in the following scenario: The transmit end is a terminal, the source receive end is a base station corresponding to a source cell, and the target receive end is a base station corresponding to a target cell. That the transmit end switches from sending a packet to the source receive end to sending a packet to the target receive end includes: switching from sending, through the source cell, a packet to the base station corresponding to the source cell to sending, through the target cell, a packet to the base station corresponding to the target cell.

In an embodiment, the data transmission method provided in this application may be further used in the following scenario: The transmit end is a gateway, the source receive end is a source base station, and the target receive end is a target base station. This case is equivalent to a downlink data transmission scenario.

In an embodiment, the data transmission method provided in this application may be further used in the following scenario: The transmit end is a video stream compression end, the source receive end is a source video stream decompression end, and the target receive end is a target video stream decompression end.

In an embodiment, the data transmission method provided in this application may be further used in the following scenario: The transmit end is a station, the source receive end is a source access point, and the target receive end is a target access point.

In an embodiment, that the transmit end obtains the indication information used to indicate that the first compressed packet is lost or fails to be decompressed includes:

If the transmit end does not receive acknowledgment information of the first compressed packet within preset duration, the transmit end generates the indication information. Alternatively, the transmit end receives a status report. The status report includes the indication information used to indicate that the first compressed packet is lost or fails to be decompressed, or the status report includes indication information used to indicate that the first compressed packet and the second compressed packet are lost or fail to be decompressed.

According to a second aspect, this application provides a data transmission method. The method includes:

A receive end receives a target original packet or a target compressed packet sent by a transmit end. The target compressed packet is generated by compressing the target original packet based on a preset compression parameter. The target original packet includes at least one of the following packets: a first original packet corresponding to a first compressed packet, and a second original packet corresponding to a second compressed packet compressed after the first compressed packet.

In an embodiment, that a receive end receives a target original packet or a target compressed packet sent by a transmit end includes: The receive end receives a third compressed packet and a fourth compressed packet. The third compressed packet is generated by compressing the first original packet based on the preset compression parameter, the fourth compressed packet is generated by compressing the second original packet based on a compression parameter corresponding to the third compressed packet, and the compression parameter corresponding to the third compressed packet is generated by updating the preset compression parameter based on the first original packet. The method further includes:

The receive end decompresses the third compressed packet based on the preset compression parameter, to obtain the first original packet.

The receive end updates the preset compression parameter based on the first original packet, to generate the compression parameter corresponding to the third compressed packet.

The receive end decompresses the fourth compressed packet based on the compression parameter corresponding to the third compressed packet, to obtain the second original packet.

According to a third aspect, this application provides a data transmission method. The method includes:

When detecting that a first compressed packet sent by a transmit end is lost or fails to be decompressed, a receive end discards a second compressed packet that is sent after the first compressed packet.

In an embodiment, after the receive end finds that the transmit end switches from sending a packet to the receive end to sending a packet to another receive end, or switches from sending a packet in a first compressed manner to sending a packet in a second compressed manner, or the transmit end switches from a state of sending a packet in a compressed manner to a state of sending a packet in an uncompressed manner, if the receive end detects that the first compressed packet is lost or fails to be decompressed, the receive end may discard the second compressed packet.

In an embodiment, the method further includes: The receive end sends a status report. The status report includes indication information used to indicate that the first compressed packet is lost or fails to be decompressed, or the status report includes indication information used to indicate that the first compressed packet and the second compressed packet are lost or fail to be decompressed.

According to a fourth aspect, this application provides a data transmission method. The method includes:

A target receive end receives a first status report sent by a source receive end. The first status report includes indication information used to indicate that a first compressed packet is lost or fails to be decompressed.

The target receive end sends a second status report to a transmit end. The second status report includes indication information used to indicate that the first compressed packet and a second compressed packet that is sent after the first compressed packet are lost or fail to be decompressed.

According to a fifth aspect, this application provides a data transmission apparatus that is on a transmit end side. The apparatus may be a transmit end, or may be a chip in a transmit end. The apparatus has functions of implementing the transmit end in any aspect of the first aspect. The functions may be implemented by hardware, or may be implemented by hardware by executing corresponding software. The hardware or the software includes one or more units corresponding to the foregoing functions.

In an embodiment, when the apparatus is a transmit end, the transmit end includes a processor and a transceiver, and the processor is configured to support the transmit end in executing corresponding functions in the foregoing method. The transceiver is configured to: support communication between the transmit end and a receive end, and send the information or the instruction in the foregoing method to the receive end. In an embodiment, the transmit end may further include a memory. The memory is configured to be coupled to the processor, and the memory stores a program instruction and data that are necessary for the transmit end.

In an embodiment, the apparatus includes a processor, a baseband circuit, a radio frequency circuit, and an antenna. The processor is configured to control a function of each circuit part. The baseband circuit is configured to generate various signaling and messages, such as a response message, a transmit end selection request message, a transmit end indication message, and an acknowledgment message. After being processed, such as analog conversion, filtering, amplification, and up-conversion, by the radio frequency circuit, the signaling and messages are transmitted to a receive end through the antenna. In an embodiment, the apparatus may further include a memory. The memory stores a program instruction and data that are necessary for the transmit end.

In an embodiment, the apparatus may include a processor and a modem. The processor may be configured to run an instruction or an operating system, to control functions of the transmit end. The modem may encapsulate, encode and decode, modulate and demodulate, or equalize data according to a protocol, to generate a radio frame, so as to support the transmit end in executing corresponding functions in any aspect of the first aspect and the third aspect.

In an embodiment, when the apparatus is a chip in a transmit end, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer executable instruction stored in a storage unit, to support the transmit end in executing corresponding functions in the foregoing method. In an embodiment, the storage unit may be a storage unit in the chip, for example, a register or a buffer. The storage unit may be alternatively a storage unit that is in the transmit end and that is located outside the chip, for example, may be a read-only memory (ROM) or another type of static storage device that can store static information and an instruction, or a random access memory (RAM).

In an embodiment, the apparatus includes a processor. The processor is configured to: be coupled to a memory, read an instruction in the memory, and perform, based on the instruction, the method in any aspect of the first aspect and the third aspect. The memory may be located inside the processor, or may be located outside the processor.

According to a sixth aspect, this application provides a data transmission apparatus that is on a receive end side. The apparatus may be a receive end, or may be a chip in a receive end. The apparatus has functions of implementing the receive end, the source receive end, or the target receive end in any aspect of the second aspect, the third aspect, and the fourth aspect. The functions may be implemented by hardware, or may be implemented by hardware by executing corresponding software. The hardware or the software includes one or more units corresponding to the foregoing functions.

In an embodiment, when the apparatus is a receive end, the receive end includes a processor and a transceiver, and the processor is configured to support a transmit end in executing corresponding functions in the foregoing method. The transceiver is configured to: support communication between the receive end and the transmit end, and send the information or the instruction in the foregoing method to the transmit end. In an embodiment, the receive end may further include a memory. The memory is configured to be coupled to the processor, and the memory stores a program instruction and data that are necessary for the transmit end.

In an embodiment, the apparatus includes a processor, a baseband circuit, a radio frequency circuit, and an antenna. The processor is configured to control a function of each circuit part. The baseband circuit is configured to generate various signaling and messages. After being processed, such as analog conversion, filtering, amplification, and up-conversion, by the radio frequency circuit, the signaling and messages are transmitted to the receive end through the antenna. In an embodiment, the apparatus may further include a memory. The memory stores a program instruction and data that are necessary for the receive end.

In an embodiment, the apparatus may include a processor and a modem. The processor may be configured to run an instruction or an operating system, to control functions of the receive end. The modem may encapsulate, encode and decode, modulate and demodulate, or equalize data according to a protocol, to generate a radio frame, so as to support the receive end in executing corresponding functions in any aspect of the second aspect, the third aspect, and the fourth aspect.

In an embodiment, when the apparatus is a chip in a transmit end, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer executable instruction stored in a storage unit, to support the transmit end in executing corresponding functions in the foregoing method. In an embodiment, the storage unit may be a storage unit in the chip, for example, a register or a buffer. The storage unit may be alternatively a storage unit that is in the receive end and that is located outside the chip, for example, may be a read-only memory (ROM) or another type of static storage device that can store static information and an instruction, or a random access memory (RAM).

In an embodiment, the apparatus includes a processor. The processor is configured to: be coupled to a memory, read an instruction in the memory, and perform, based on the instruction, the method in any aspect of the second aspect, the third aspect, and the fourth aspect. The memory may be located inside the processor, or may be located outside the processor.

According to a seventh aspect, an embodiment of this application provides a computer-readable medium, configured to store a computer program. The computer program includes an instruction used to perform the method according to any one of the first aspect or the possible embodiments of the first aspect.

According to an eighth aspect, an embodiment of this application provides a computer-readable medium, configured to store a computer program. The computer program includes an instruction used to perform the method according to any one of the second aspect to the fourth aspect or the possible embodiments of the second aspect to the fourth aspect.

According to a ninth aspect, an embodiment of this application provides a computer program. The computer program includes an instruction used to perform the method according to any one of the first aspect or the possible embodiments of the first aspect.

According to a tenth aspect, an embodiment of this application provides a computer program. The computer program includes an instruction used to perform the method according to any one of the second aspect to the fourth aspect or the possible embodiments of the second aspect to the fourth aspect.

According to an eleventh aspect, an embodiment of this application provides a data transmission system. The system includes the transmit end and the receive end in the first aspect and the second aspect.

According to a twelfth aspect, an embodiment of this application provides a data transmission system. The system includes the transmit end and the receive end in the first aspect and the third aspect.

According to a thirteenth aspect, an embodiment of this application provides a data transmission system. The system includes the transmit end, the source receive end, and the target receive end in the first aspect and the fourth aspect.

DESCRIPTION OF EMBODIMENTS

Terms used in embodiments of this application are merely intended to explain specific embodiments of this application, and are not intended to limit this application.

A data transmission method provided in this application may be used in various data transmission scenarios, for example, a wireless communication scenario, a wired communication scenario, a point-to-point communication scenario, and a video stream transmission scenario. The wireless communication scenario may be, for example, a mobile communications network or a wireless local area network (WLAN).

The data transmission method provided in the embodiments of this application may be performed by a transmit end and a receive end. In an example, the transmit end may be a terminal in the mobile communications network, and the receive end may be a base station in the mobile communications network. In another example, the transmit end may be a video stream compression end, and the receive end may be a video stream decompression end. In still another example, the transmit end may be a station (STA), and the receive end may be an access point (AP). For example, the transmit end and the receive end may be respectively a station and an access point in a Wi-Fi field. In yet another example, the transmit end may be a gateway in the mobile communications network, and the receive end may be a base station in the mobile communications network. For example, the receive end may be an evolved NodeB (eNB) in a long term evolution (LTE) network.

The following uses the mobile communications network as an example to describe application scenarios of the data transmission method provided in this application.

Figure 1A:
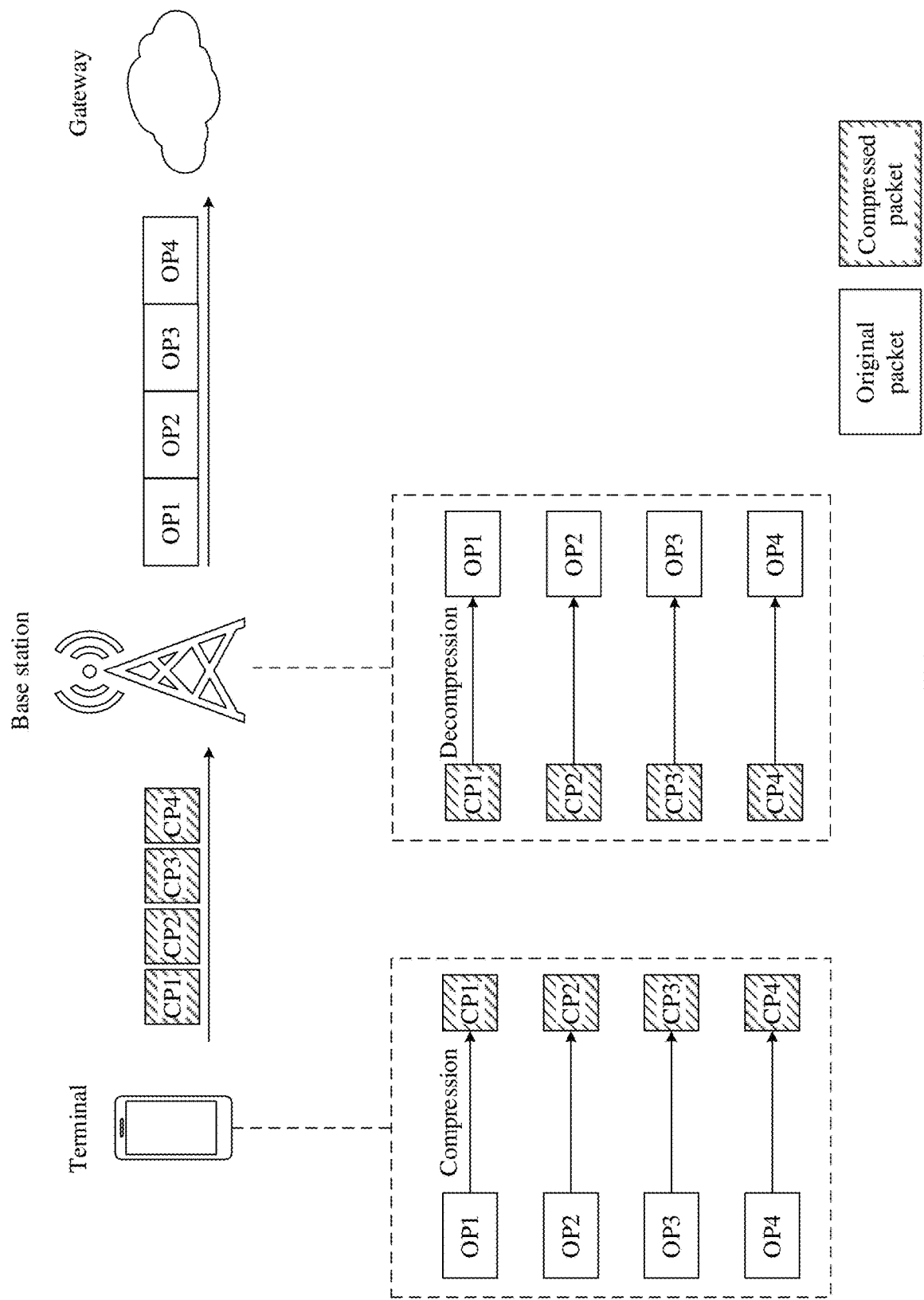
FIG. 1A is a schematic diagram 1 of an application scenario.

FIG. 1A is a schematic diagram 1 of an application scenario. A network device in FIG. 1A includes a terminal, a base station, and a gateway. The terminal may send a packet of uplink data to the gateway through the base station, and the gateway may send downlink data to the terminal through the base station.

When the uplink data is sent, a transmit end is the terminal, and a receive end is the base station. A process in which the terminal sends the uplink data to the base station may include the following operations.

Operation 1: The terminal may obtain several original packets that need to be sent.

The original packet may be an original uncompressed data packet or a data packet that is not compressed. The original packet may carry data such as a video stream, a chat message, a picture, a voice, an application message, and control signaling in a communications network. The original packet may be a transmission control protocol (TCP) packet, a user datagram protocol (UDP) packet, a packet data convergence protocol (PDCP) packet, or the like generated by an upper layer of a MAC layer. This is not limited in this application. Table 1A is an example of the original packet.

TABLE 1A

| Original packet | OP1 | OP2 | OP3 | OP4 | ... | OPn − 1 | OPn |
|---|---|---|---|---|---|---|---|

As shown in Table 1A, the terminal may obtain the original packets OP1, OP2, OP3, OP4, . . . , OPn−1, and OPn.

Operation 2: The terminal may perform compression processing on each original packet based on a compressed manner negotiated with the base station in advance, to obtain a compressed packet corresponding to the original packet.

Compression processing performed by the terminal on the uplink data may be referred to as uplink data compression (UDC). The compressed manner may be a manner of performing compression processing by using a compression algorithm such as a lossy compression algorithm or a lossless compression algorithm. For example, the lossless compression algorithm includes compression algorithms such as differential encoding, a run length compression algorithm (RLE), Huffman encoding, Lempel-Ziv-Welch compression algorithm (LZW) encoding, and arithmetic encoding. Table 1B is an example of the compressed packet corresponding to the original packet.

TABLE 1B

| Original packet | OP1 | OP2 | OP3 | OP4 | ... | OPn − 1 | OPn |
|---|---|---|---|---|---|---|---|
| Compressed packet corresponding to the original packet | CP1 | CP2 | CP3 | CP4 | ... | CPn − 1 | CPn |

As shown in Table 1B, the terminal compresses OP1 to obtain CP1, compresses OP2 to obtain CP2, compresses OP3 to obtain CP3, and compresses OP4 to obtain CP4. For example, OPn−1 indicates an $(n-1)^{th}$ original packet, OPn indicates an $n^{th}$ original packet, CPn−1 indicates an $(n-1)^{th}$ compressed packet, and CPn indicates an $n^{th}$ compressed packet.

Operation 3: The terminal sends the generated compressed packets to the base station.

For example, the terminal sends CP1, CP2, CP3, and CP4 to the base station.

Operation 4: The terminal buffers the compressed packets that are already sent.

For example, the terminal locally buffers CP1, CP2, CP3, and CP4.

Operation 5: The base station decompresses the received compressed packets to obtain corresponding original packets.

For example, the base station receives CP1 and CP2, decompresses CP1 to obtain OP1, and decompresses CP2 to obtain OP2.

Operation 6: The base station sends, to the gateway, the original packets obtained after decompression.

For each original packet obtained after successful decompression, the base station may send, to the gateway based on a sequence number of the original packet by using a sliding window mechanism, each original packet obtained after the decompression. For example, the base station may send OP1 and OP2 to the gateway.

Operation 7: The base station sends an acknowledgment message to the terminal. The acknowledgment message includes a sequence number of a compressed packet that is successfully decompressed.

For example, the base station may send, to the terminal, an acknowledgment message carrying sequence numbers of CP1 and CP2.

Operation 8: The terminal deletes the compressed packet that is successfully decompressed from the buffer.

For example, after receiving the acknowledgment message, the terminal can delete locally buffered CP1 and CP2.

It can be learned that, the terminal performs Operation 1, Operation 2, Operation 4, and Operation 8 on each original packet and the corresponding compressed packet based on a sequence of the sequence numbers of the original packets. Correspondingly, the base station may perform Operation 5, Operation 6, and Operation 7 on each received compressed packet and the corresponding original packet.

It should be noted that, in a process of sending the uplink data, the compressed packet sent by the terminal to the base station may not be received by the base station due to reasons such as interference in an air interface transmission process, or the base station cannot decompress the received compressed packet due to a transmission error. In this case, the base station may send a status report, to indicate the terminal to retransmit compressed packets corresponding to the sequence numbers. Therefore, the process of sending the uplink data may further include the following operations.

Operation 9: If the base station detects that a compressed packet is lost or fails to be decompressed, the base station may send a status report message to the terminal. The status report message includes a sequence number of the compressed packet that is lost or fails to be decompressed.

Figure 1B:
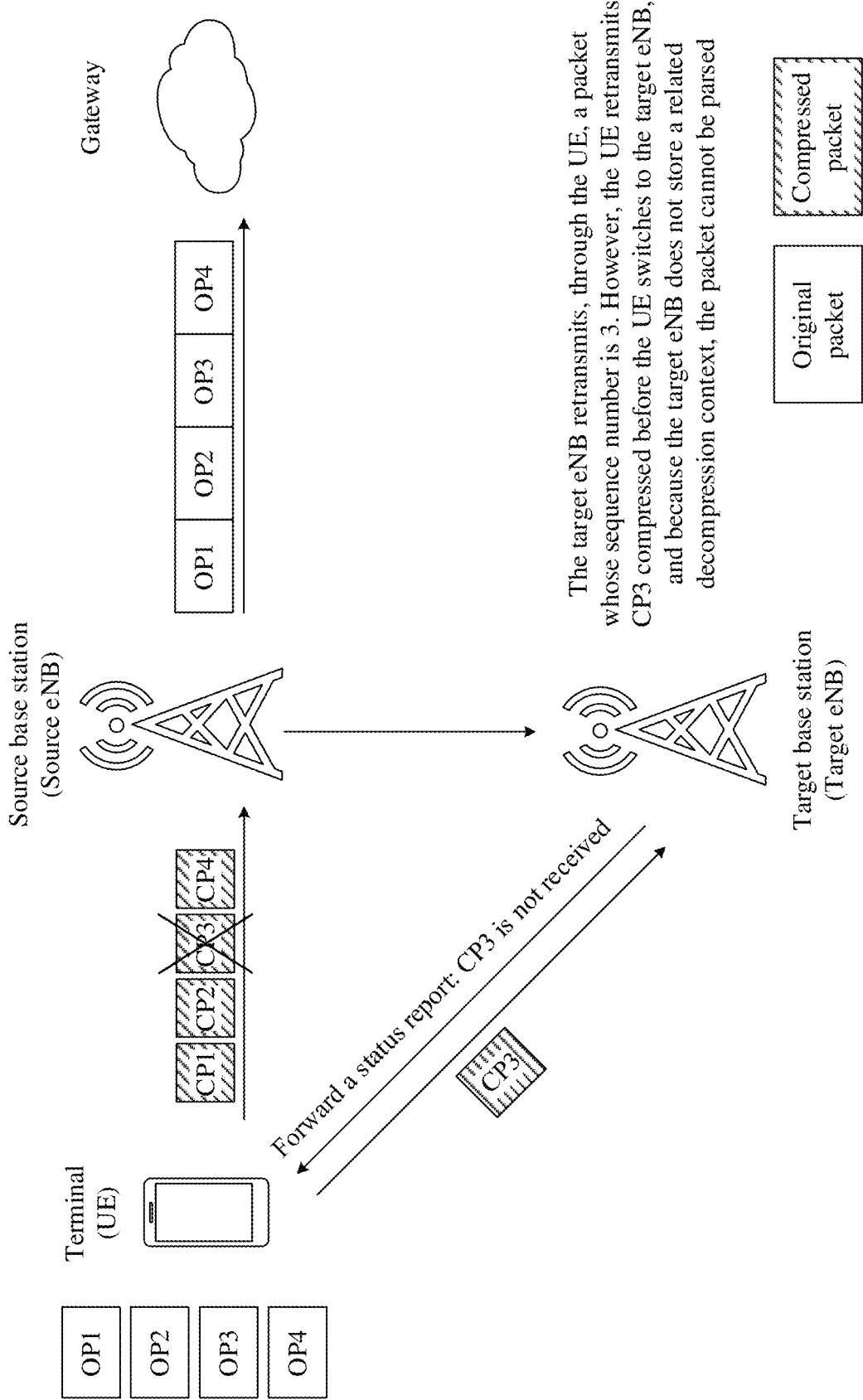
FIG. 1B is a schematic diagram of a transmission scenario.

As shown in FIG. 1B, CP3 is lost in a transmission process. The base station may send a status report to the terminal, to notify the terminal that CP3 is lost. In this case, if the base station already receives the compressed packet CP4 whose sequence number is behind that of CP3, the base station may buffer CP4 or decompress CP4.

Operation 10: The terminal reads a pre-buffered compressed packet based on the sequence number that is of the compressed packet and that is in the status report, and resends the pre-buffered compressed packet to the base station.

For example, the base station sends CP3 stored in the buffer to the base station again.

Operation 11: If the base station receives the resent compressed packet, the base station decompresses the resent compressed packet.

For example, if the base station receives resent CP3, the base station decompresses CP3 to obtain OP3.

Operation 12: If the base station successfully decompresses the resent compressed packet, the base station sends, to the gateway, an original packet obtained after the decompression.

For example, if the base station successfully decompresses resent CP3, the base station sends, to the gateway, OP3 obtained after the decompression. If the base station already successfully decompresses CP4 to obtain OP4, the base station may send OP4 to the gateway according to the sliding window protocol.

Operation 13: The base station sends an acknowledgment message to the terminal. The acknowledgment message includes a sequence number of the resent compressed packet.

For example, the base station sends, to the terminal, an acknowledgment message including the sequence number of CP3.

Operation 14: The terminal deletes the resent compressed packet from the buffer.

For example, the terminal deletes buffered CP3.

Operation 15: The terminal continues to send another compressed packet to the base station.

field "A, B, J, K". The data field is data that is not repeated in the original packet and the compression context. After receiving the compressed packet, a base station side may decompress the compressed packet based on the compression context "C, D, E, F, G, H, I, . . . " negotiated with the terminal in advance, to obtain the original packet "A, B, C, D, E, F, G, H, I, J, K". It can be learned that the compression context needs to be consistent between the terminal and the base station, and a compression and decompression context changes with a change of a data packet. Therefore, uplink data compression highly depends on an arrival sequence of data packets. If a data packet is lost or out of order, the context between the terminal and the base station is no longer consistent. Consequently, the data packet cannot be successfully decompressed.

In an example, Table 1C is an example of a correspondence among an original packet, a compression parameter used to compress the original packet, a compressed packet obtained by compressing the original packet based on the compression parameter, and a compression parameter corresponding to each compressed packet that are in the compressed manner with the association feature.

TABLE 1C

| Original packet | Compression parameter used to compress the original packet | Compressed packet that corresponds to the original packet and that is obtained by compressing the original packet based on the compression parameter | First generation manner of the compression parameter corresponding to the compressed packet (The compression parameter corresponding to the compressed packet is generated by updating the compression parameter based on the original packet) |
|---|---|---|---|
| OP1 | PC0 | CP1 = f1(OP1, PC0) | PC1 = f2(PC0, OP1) |
| OP2 | PC1 | CP2 = f1(OP2, PC1) | PC2 = f2(PC1, OP2) |
| OP3 | PC2 | CP3 = f1(OP3, PC2) | PC3 = f2(PC2, OP3) |
| OP4 | PC3 | CP4 = f1(OP4, PC3) | PC4 = f2(PC3, OP4) |
| ... | ... | ... | ... |
| OPn − 1 | PCn − 2 | CPn − 1 = f1(OPn − 1, PCn − 2) | PCn − 1 = f2(PCn − 2, OPn − 1) |
| OPn | PCn − 1 | CPn = f1(OPn, PCn − 1) | PCn = f2(PCn − 1, OPn) |
| OPn + 1 | PCn | CPn + 1 = f1(OPn + 1, PCn) | PCn + 1 = f2(PCn, OPn + 1) |

To improve a compression effect, the compressed manner negotiated by the terminal with the base station may be a compressed manner with an association feature.

After the terminal negotiates with the base station to enable the compressed manner to transmit a packet, the terminal may compress OP1 based on a preset compression parameter PC0 corresponding to the negotiated compressed manner, to obtain CP1. Then, the terminal may compress, based on the sequence numbers of the original packets and a compression parameter that corresponds to a compressed packet that is processed earlier, an original packet that is processed later. Correspondingly, after receiving CP1, the base station may decompress CP1 based on PC0 to obtain OP1. Then, the base station may first decompress, based on the sequence numbers of the compressed packets, a compressed packet whose sequence number is smaller, and then decompress a compressed packet whose sequence number follows the sequence number.

For example, on a terminal side, data in the original packet may include "A, B, C, D, E, F, G, H, I, J, K", and a compression context may be "C, D, E, F, G, H, I, . . . ". It can be learned that "C, D, E, F, G, H, I" in the original packet is the same as the compression context, in other words, "C, D, E, F, G, H, I" and the compression context are repeated data. In this case, a compressed packet transmitted over an air interface may include a compressed header and a data A compression parameter used to compress OP1 is a preset compression parameter PC0, and OP1 is compressed based on PC0 and f1 to obtain a compressed packet CP1 corresponding to OP1, where f1 may be determined based on a compression algorithm used in the compressed manner. PC may be updated based on OP1 and f2 to generate a compression parameter PC1 used to compress OP2, where f2 may be determined based on an algorithm used for updating the compression parameter in the compressed manner. By analogy, a compression parameter used to compress OPn that exists after OP1 is PCn−1, and PCn−1 may be generated after PCn−2 is updated based on OPn−1. OPn is compressed based on PCn−1 and f1 to obtain a compressed packet CPn corresponding to OPn, and PCn−1 may be updated based on OPn and f2 to generate a compression parameter PCn used to compress OPn+1.

For example, that the terminal compresses OP1 based on P0C and f1 to obtain CP1, and updates PC0 based on OP1 and f2 to generate the compression parameter PC1 used to compress OP2 may be implemented by using the following operations.

Operation 1-1: Compare data in OP1 with data in PC0, and determine a data segment SAME1 that is in OP1 and that is the same as that in PC0 and a data segment DIFF1 that is in OP1 and that is different from that in OP1.

Operation 1-2: Obtain a location identifier POS1 of SAME1 in PC0, and packet and compress POS1 and DIFF1 to generate CP2.

Operation 1-3: Add DIFF1 to PC0 to generate PC1.

By analogy, for OPn that exists after OP1, the terminal compresses OPn based on PCn−1 and f1 to obtain CPn, and updates PCn−1 based on OPn and f2 to generate a compression parameter PCn used to compress OPn+1. The procedure may be implemented by using the following operations.

Operation 1-4: Compare data in OPn with data in PCn−1, and determine a data segment SAMEn that is in OPn and that is the same as that in PCn−1 and a data segment DIFFn that is in OPn and that is different from that in OPn−1.

Operation 1-5: Obtain a location identifier POSn of SAMEn in PCn−1, and packet and compress POSn and DIFFn to generate CPn.

Operation 1-6: Add DIFFn to PCn−1 to generate PCn.

In this application, the compression parameter used to compress the original packet may be a compression context, and the compression context may represent information on which a compression and decompression process is depended, and may be a stored historical data packet or a part of a frequently used data segment. The compression context may also be referred to as a dictionary, and the preset compression parameter may be a preset compression context or a preset dictionary. The preset compression context or the preset dictionary may be obtained from a network server, or may be obtained through negotiation between the transmit end and the receive end in advance. The terminal uses the preset compression context to compress a first to-be-sent original packet that exists after the compressed manner is enabled, the base station uses the preset compression context to decompress a first received compressed packet that exists after the compressed manner is enabled. The preset compression context may include data with a relatively high repetition degree after big data statistics are performed by the network server. Alternatively, the preset compression context may not include any data, in other words, the preset compression context may also be empty.

In another embodiment of this application, the terminal may set a maximum length value for the compression context. When the length of the compression context is greater than the maximum length value, the terminal may delete a part of the data segment in the current compression context, for example, may delete a data segment that is added to the compression context earlier, and for another example, may delete a data segment with a relatively small quantity of matching times in a plurality of times of compression processing. This is not limited in this application.

In another example, the compression parameter used to compress the original packet may alternatively be determined based on an original packet corresponding to a compressed packet compressed earlier.

Table 1D is another example of a correspondence among an original packet, a compression parameter used to compress the original packet, a compressed packet obtained by compressing the original packet based on the compression parameter, and a compression parameter corresponding to the compressed packet that are in the compressed manner with the association feature.

TABLE 1D

| Original packet | Compression parameter used to compress the original packet | Compressed packet that corresponds to the original packet and that is obtained by compressing the original packet based on the compression parameter | Second generation manner of the compression parameter corresponding to the compressed packet (The compression parameter corresponding to the compressed packet is determined based on the original packet corresponding to the compressed packet) |
|---|---|---|---|
| OP1 | PC0 | CP1 = f1(OP1, PC0) | PC1 = f3(OP1) |
| OP2 | PC1 | CP2 = f1(OP2, PC1) | PC2 = f3(OP2) |
| OP3 | PC2 | CP3 = f1(OP3, PC2) | PC3 = f3(OP3) |
| OP4 | PC3 | CP4 = f1(OP4, PC3) | PC4 = f3(OP4) |
| ... | ... | ... | ... |
| OPn − 1 | PCn − 2 | CPn − 1 = f1(OPn − 1, PCn − 2) | PCn − 1 = f3(OPn − 1) |
| OPn | PCn − 1 | CPn = f1(OPn, PCn − 1) | PCn = f3(OPn) |
| OPn + 1 | PCn | CPn + 1 = f1(OPn + 1, PCn) | PCn + 1 = f3(OPn + 1) |

As shown in Table 1D, a difference from Table 1C lies in that the terminal may generate, based on OP1 and f3, a compression parameter PC1 used to compress OP2. The terminal may generate, based on OPn−1 and f3, a compression parameter PCn−1 used to compress OPn.

For example, the terminal may compare data in OP2 with data in OP1, to determine a data segment that is in OP2 and that is the same as that in OP1 and a data segment that is in OP2 and that is different from that in OP1. Then, a location identifier of the same data segment in OP1 is obtained, and the location identifier and the data segment that is in OP2 and that is different from that in OP1 are packed and compressed to generate CP2. Correspondingly, after decompressing OP1, the base station may decompress CP2 based on OP1, to obtain OP2.

It should be noted that, when the foregoing two compressed manners with association features are used to transmit data, if CP3 is lost or fails to be decompressed, the base station can decompress CP4 only after retransmitted CP3 is successfully decompressed.

In a scenario in which a compressed manner with an association feature is used to transmit data, some problems may exist when a data transmission manner between the transmit end and the receive end changes.

For example, the change of the data transmission manner may include one or a combination of the following cases:

Case 1: The data transmission manner is switched from transmitting a packet in a compressed manner to transmitting a packet in an uncompressed manner.

Case 2: The data transmission manner is switched from transmitting a packet in a first compressed manner to transmitting a packet in a second compressed manner.

Case 3: The transmit end switches from sending a packet to a source receive end to sending a packet to a target receive end.

In the foregoing Case 2 and Case 3, for the transmit end, after switching the data transmission manner, the transmit end needs to restart compression, to be specific, the transmit end needs to enable a preset compression parameter corresponding to the compressed manner to compress a first to-be-compressed original packet that exists after the compression is restarted. Correspondingly, for the receive end, after switching the data transmission manner, the receive end also needs to restart a corresponding decompression processing procedure, to be specific, the receive end needs to enable a preset compression parameter corresponding to the compressed manner to decompress a first to-be-decompressed compressed packet that exists after the compression is restarted.

In other words, after the data transmission manner is switched, for Case 1 and Case 2, the receive end no longer reserves a compression parameter corresponding to a last compressed packet decompressed before the data transmission manner is switched, and the receive end cannot decompress a compressed packet compressed before the data transmission manner is switched and after the last compressed packet. For Case 3, because the target receive end does not store the compression parameter corresponding to the last compressed packet decompressed before the data transmission manner is switched, the target receive end cannot decompress the compressed packet compressed before the data transmission manner is switched and after the last compressed packet.

Consequently, if a compressed packet is lost or fails to be decompressed, when the terminal resends the compressed packet that is lost or fails to be decompressed, the base station cannot decompress the resent compressed packet. Then, the terminal feeds back, to an upper layer, a message indicating that the packet fails to be sent, to trigger the upper layer to re-deliver an original packet. For example, the upper layer of the MAC layer of the terminal may be a TCP layer. When the TCP layer is triggered to re-deliver an original packet, a transmission rate at the TCP layer is greatly reduced.

FIG. 1B is a schematic diagram of a transmission scenario.

As shown in FIG. 1B, a terminal (UE) sends CP1, CP2, CP3, and CP4 to a source base station, where CP3 is lost or fails to be decompressed. The source base station sends indication information to a target base station, where the indication information indicates that CP3 is not received and CP4 is received. The target base station forwards a status report to the terminal, where the status report indicates that CP3 is not received, and the terminal is already indicated to retransmit CP3. The terminal resends, to the base station, CP3 compressed before the terminal switches to the target base station. The target base station does not store a related decompression context, and consequently cannot parse CP3. For example, the base station may be an evolved NodeB (eNB).

To resolve the foregoing problem, this application provides a data transmission method. After a data transmission manner between a transmit end and a receive end is switched, if the transmit end obtains indication information used to indicate that a first compressed packet is lost or fails to be decompressed, the transmit end sends a target original packet or a target compressed packet to the receive end. The target compressed packet is generated by compressing the target original packet based on a preset compression parameter, and the target original packet may include at least one of the following packets: a first original packet corresponding to the first compressed packet, and a second original packet corresponding to a second compressed packet compressed after the first compressed packet. In this way, the receive end does not need to decompress the first compressed packet or the second compressed packet, but can directly obtain an original packet or decompress an original packet based on the preset compression parameter, to obtain the original packet corresponding to the first compressed packet or the original packet corresponding to the second compressed packet, thereby reducing a quantity of times of triggering retransmission, and further improving transmission efficiency that exists when a compressed packet is lost or fails to be decompressed.

Figure 2:
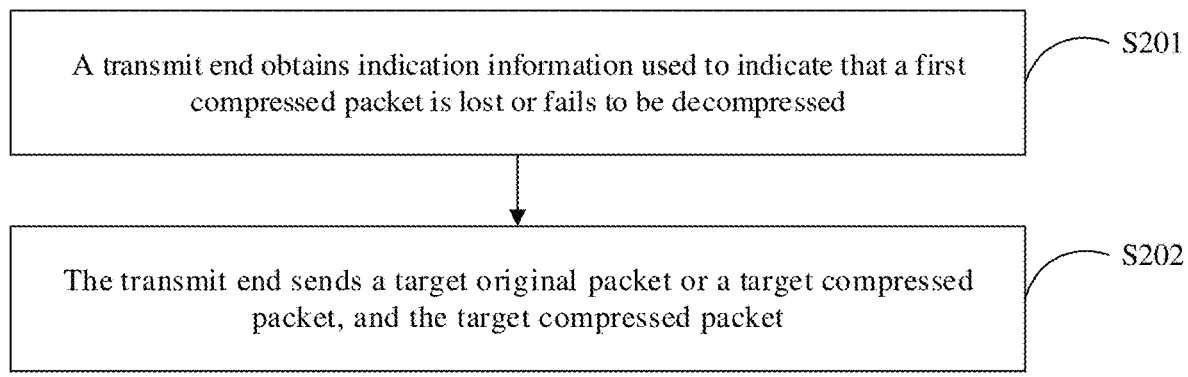
FIG. 2 is a schematic interaction flowchart 1 of a data transmission method according to this application.

FIG. 2 is a schematic interaction flowchart 1 of a data transmission method according to this application.

As shown in FIG. 2, this embodiment of this application may be performed by a transmit end. This embodiment of this application may include the following operations.

S201: The transmit end obtains indication information used to indicate that a first compressed packet is lost or fails to be decompressed.

In an embodiment, the transmit end may obtain, in the following manner, the indication information used to indicate that the first compressed packet is lost or fails to be decompressed.

In an embodiment, if the transmit end does not receive acknowledgment information of the first compressed packet within preset duration, the transmit end may generate the indication information.

In an embodiment, the transmit end may receive a status report. The status report may include the indication information used to indicate that the first compressed packet is lost or fails to be decompressed, or the status report may include indication information used to indicate that the first compressed packet and a second compressed packet are not lost or fail to be decompressed.

It should be noted that the transmit end may obtain, before a data transmission manner is switched or after a data transmission method is switched, the indication information used to indicate that the first compressed packet is lost or fails to be decompressed. In an example, a receive end may send the status report to the transmit end before the data transmission method is switched or after the data transmission method is switched.

In an embodiment, after the transmit end obtains the indication information, the transmit end may perform, after the data transmission manner is switched, retransmission processing on a compressed packet that is lost or fails to be decompressed.

S202: The transmit end sends a target original packet or a target compressed packet, and the target compressed packet.

The target original packet may include at least one of the following packets: a first original packet corresponding to the first compressed packet, and a second original packet corresponding to the second compressed packet compressed after the first compressed packet.

In an embodiment, the first compressed packet may be a compressed packet generated in a compressed manner with an association feature before the data transmission manner is switched. For example, any compressed manner with the association feature shown in Table 1C or Table 1D may be used.

In an embodiment, the first compressed packet may be generated by compressing the first original packet based on a compression parameter corresponding to a sixth compressed packet compressed before the first compressed packet. The compression parameter corresponding to the sixth compressed packet is generated by updating, based on the first original packet, a compression parameter corresponding to a seventh compressed packet compressed before the sixth compressed packet; or the compression parameter corresponding to the sixth compressed packet is a preset compression parameter. In another embodiment of this application, when the transmit end uses the compressed manner with the association feature shown in Table 1D, the compression parameter corresponding to the sixth compressed packet may be determined based on a fourth original packet corresponding to the sixth compressed packet.

In an embodiment, the second compressed packet may also be generated by compressing the second original packet in the compressed manner with the association feature.

In an embodiment, the second compressed packet may be generated by compressing the second original packet based a compression parameter corresponding to the first compressed packet. The compression parameter corresponding to the first compressed packet may be generated by updating, based on the first original packet, the compression parameter corresponding to the sixth compressed packet compressed before the first compressed packet, or the compression parameter corresponding to the first compressed packet is a preset compression parameter corresponding to a compressed manner used by the transmit end before the transmission manner is switched. In another embodiment of this application, when the transmit end uses the compressed manner with the association feature shown in Table 1D, the compression parameter corresponding to the first compressed packet is determined based on the first original packet.

Table 2 is an example of several cases of the first compressed packet and the second compressed packet that are lost or fail to be decompressed.

compressing OP2 based on PC1, and CP3 is generated by compressing OP3 based on PC2. The first compressed packet that is lost or fails to be decompressed may include three cases.

Case 1: The first compressed packet is CP3, the first original packet is OP3, the sixth compressed packet is CP2, the seventh compressed packet is CP1, and the second compressed packet may be CP4.

Case 2: The first compressed packet is CP2, the first original packet is OP2, the sixth compressed packet is CP1, and correspondingly, the second compressed packet may be CP3.

Case 3: The first compressed packet is CP4, the first original packet is OP4, the sixth compressed packet is CP3, the seventh compressed packet is CP2, and correspondingly, the second compressed packet may be CP5.

In an embodiment, for different switched data transmission manners, operation S202 may include the following several embodiments.

In an embodiment of operation S202, if the transmit end switches from sending a packet in a compressed manner to sending a packet in an uncompressed manner, operation S202 may include: The transmit end sends the target original packet.

In an embodiment, the transmit end may send the first original packet.

In an embodiment, the transmit end may send the second original packet.

In an embodiment, the transmit end may send the first original packet and the second original packet.

TABLE 2

| | | | | | |
|---|---|---|---|---|---|
| Original packet obtained before the data transmission manner is switched | OP1 | OP2 | OP3 | OP4 | |
| Original packet obtained after the data transmission manner is switched | | | | | OP5 |
| Compression parameter used to generate a compressed packet | PC0 | PC1/OP1 | PC2/OP2 | PC3/OP3 | PC0 or others |
| Compressed packet compressed before the data transmission manner is switched | CP1 | CP2 | CP3 | CP4 | CP5 |
| Case 1: | The seventh compressed packet is CP1 | The sixth compressed packet is CP2 | The first compressed packet is CP3 | The second compressed packet is CP4 | |
| Case 2: | The sixth compressed packet is CP1 | The first compressed packet is CP2 | The second compressed packet is CP4 | | |
| Case 3 | | The seventh compressed packet is CP2 | The sixth compressed packet is CP3 | The first compressed packet is CP4 | The second compressed packet is CP5 |

As shown in Table 2, OP1, OP2, OP3, and OP4 are original packets obtained by the transmit end before the data transmission manner is switched, and OP5 is an original packet obtained by the transmit end after the data transmission manner is switched. Before the data transmission manner is switched, OP1, OP2, OP3, and OP4 are respectively compressed into CP1, CP2, CP3, and CP4. CP1 is generated by compressing OP1 based on PC0, CP2 is generated by The manner that is in any one of the foregoing three examples and that is of sending the target original packet can reduce a probability of triggering upper-layer retransmission, thereby improving transmission efficiency that exists when a packet is lost or fails to be decompressed.

In an embodiment of operation S202, if the transmit end switches from sending a packet in a first compressed manner to sending a packet in a second compressed manner, or the transmit end switches from sending a packet to a source receive end in a compressed manner to sending a packet to a target receive end in a compressed manner, or the transmit end enters a state of enabling the preset compression parameter to send a packet, operation S202 may include: The transmit end sends the target compressed packet.

In an embodiment, the transmit end may send a third compressed packet. The third compressed packet is generated by compressing the first original packet based on the preset compression parameter.

In an embodiment, the transmit end may send a fourth compressed packet. The fourth compressed packet is generated by compressing the second original packet based on the preset compression parameter.

In an embodiment, the transmit end may send a third compressed packet and a fourth compressed packet. The third compressed packet is generated by compressing the first original packet based on the preset compression parameter, and the fourth compressed packet is generated by compressing the second original packet based on the preset compression parameter.

In an embodiment, the transmit end may send a third compressed packet and a fourth compressed packet. The third compressed packet is generated by compressing the first original packet based on the preset compression parameter, the fourth compressed packet is generated by compressing the second original packet based on a compression parameter corresponding to the third compressed packet, and the compression parameter corresponding to the third compressed packet is generated by updating the preset compression parameter based on the first original packet. In another embodiment of this application, the transmit end uses the compressed manner with the association feature shown in Table 1D, and the compression parameter corresponding to the third compressed packet may alternatively be determined based on the first original packet.

In an embodiment, after switching the data transmission manner, the transmit end may further continue to obtain, from an upper layer, an original packet that needs to be compressed. In this case, after the transmit end switches from sending a packet in a first compressed manner to sending a packet in a second compressed manner, or the transmit end switches from sending a packet to the source receive end in a compressed manner to sending a packet to the target receive end in a compressed manner, or the transmit end enters the state of enabling the preset compression parameter to send a packet, this embodiment of this application may further include the following operations.

The transmit end obtains a third original packet.

The transmit end sends a fifth compressed packet. The fifth compressed packet is generated by compressing the third original packet based on the preset compression parameter, or the fifth compressed packet is generated by compressing the third original packet based on a compression parameter corresponding to the fourth compressed packet, and the compression parameter corresponding to the fourth compressed packet is generated by updating the preset compression parameter based on the second original packet.

For example, Case 2 in Table 2 is used as an example. When the first compressed packet is CP3, the third original packet may be OP5, and the fifth compressed packet may be CP5.

In an embodiment, the receive end may receive the target original packet or the target compressed packet sent by the transmit end. The target compressed packet is generated by compressing the target original packet based on the preset compression parameter, and the target original packet includes at least one of the following packets: the first original packet corresponding to the first compressed packet, and the second original packet corresponding to the second compressed packet compressed after the first compressed packet. The receive end may use, for the transmit end, a decompressed manner and the preset compression parameter that correspond to any embodiment of operation S202 to decompress the received target compressed packet.

For example, for the fourth example in which the transmit end sends the target compressed packet, to be specific, the third compressed packet is generated by compressing the first original packet based on the preset compression parameter, the fourth compressed packet is generated by compressing the second original packet based on the compression parameter corresponding to the third compressed packet, and the compression parameter corresponding to the third compressed packet is generated by updating the preset compression parameter based on the first original packet, after the receive end receives the third compressed packet and the fourth compressed packet, the following decompression operations may be included:

The receive end decompresses the third compressed packet based on the preset compression parameter, to obtain the first original packet.

The receive end updates the preset compression parameter based on the first original packet, to generate the compression parameter corresponding to the third compressed packet.

The receive end decompresses the fourth compressed packet based on the compression parameter corresponding to the third compressed packet, to obtain the second original packet.

It can be learned that, the manner that is in any one of the foregoing three examples and that is of sending the target compressed packet is used, because the receive end may learn of the preset compression parameter, the compressed packet received after the data transmission manner is switched can be decompressed. Therefore, in the embodiments of operation S202, a probability of triggering upper-layer retransmission can be reduced, thereby determining that transmission efficiency that exists when a packet is lost or fails to be decompressed can be improved.

In addition, when the receive end detects that the first compressed packet is lost or fails to be decompressed, if the second compressed packet is already received, the second compressed packet sent after the first compressed packet may be discarded, so as to avoid that the receive end keeps waiting for decompressing the second compressed packet. In an example, only after the transmit end switches from sending a packet to the receive end to sending a packet to another receive end, or switches from sending a packet in a first compressed manner to sending a packet in a second compressed manner; or switches from a state of sending a packet in a compressed manner to a state of sending a packet in an uncompressed manner, if the receive end detects that the first compressed packet is lost or fails to be decompressed, the receive end may discard the second compressed packet.

In an embodiment, the transmit end and the receive end may alternatively use the following embodiments.

In an embodiment, the transmit end may be a gateway, the source receive end may be a source base station, and the target receive end may be a target base station. In other words, the data sending method provided in this application may also be used in a scenario in which downlink data is sent in a communications network.

In an embodiment, the transmit end may be a terminal, the source receive end may be a base station corresponding to a source cell, and the target receive end may be a base station corresponding to a target cell. Correspondingly, that the transmit end switches from sending a packet to the source receive end to sending a packet to the target receive end may include: switching from sending, through the source cell, a packet to the base station corresponding to the source cell to sending, through the target cell, a packet to the base station corresponding to the target cell. It should be noted that the base station corresponding to the source cell and the base station corresponding to the target cell may be a same base station or different base stations, and the source cell and the target cell may be a same cell or different cells. In other words, the data transmission method may be used in an intra-station handover scenario, an inter-station handover scenario, an intra-cell handover scenario, or the like.

In addition, the source cell and the target cell may be cells in a same communications system, or may be inter-system cells. For example, the source cell and the target cell may respectively be a WCDMA cell and an LTE cell, or may respectively be a UMTS cell and an LTE cell. In another embodiment of this application, the data transmission method provided in this application may be further used in scenarios of an intra-cell handover, an intra-base-station inter-cell handover, an inter-base-station handover in a 5G communications network, a scenario of a handover from an LTE network to a Wi-Fi network, and the like.

In an embodiment, the transmit end may be a video stream compression end, the source receive end may be a source video stream decompression end, and the target receive end is a target video stream decompression end. For example, the video compression end may be located in the terminal, and the video decompression end may be located in a server.

In an embodiment, the transmit end may be a station (STA), the source receive end may be a source access point (AP), and the target receive end is a target access point AP.

Embodiment 2

The following describes, by using an example in which a transmit end and a receive end are respectively a terminal and a base station, a data transmission method provided in this application.

For ease of description, an example of a packet in this embodiment of this application is as follows: Table 3 is an example of the packet in this embodiment of this application.

TABLE 3

| Before a transmission manner is switched Original packet obtained by the terminal from an upper layer | | | | After a transmission manner is switched Original packet obtained by the terminal from the upper layer |
|---|---|---|---|---|
| OP1 | OP2 | OP3 | OP4 | OP5 |
| Compressed packet compressed by the terminal | | | | |
| CP1 | CP2 | CP3 | CP4 | |

Figure 3A:
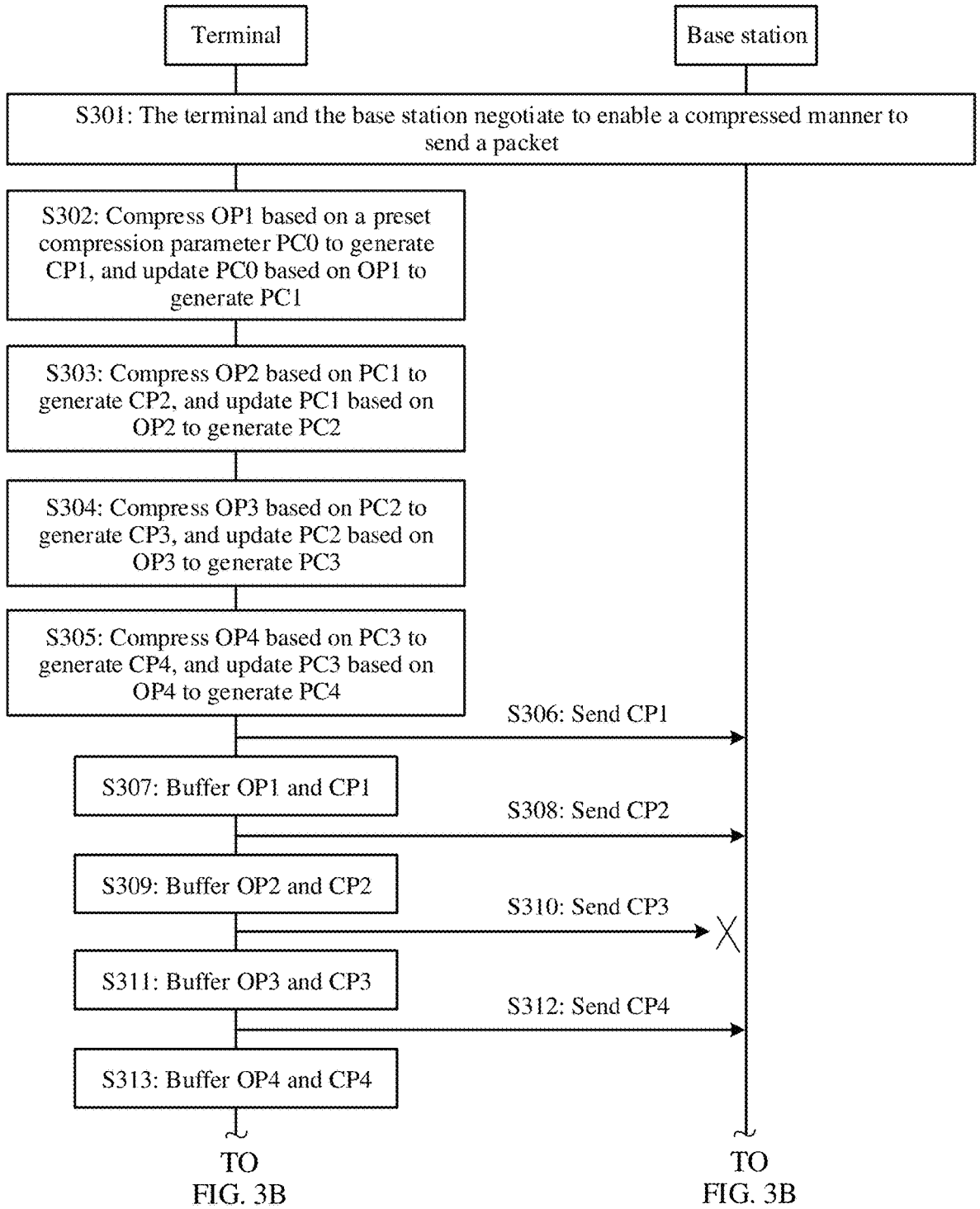
FIG. 3A and FIG. 3B is a schematic interaction flowchart 2 of a data transmission method according to this application.
Figure 3B:
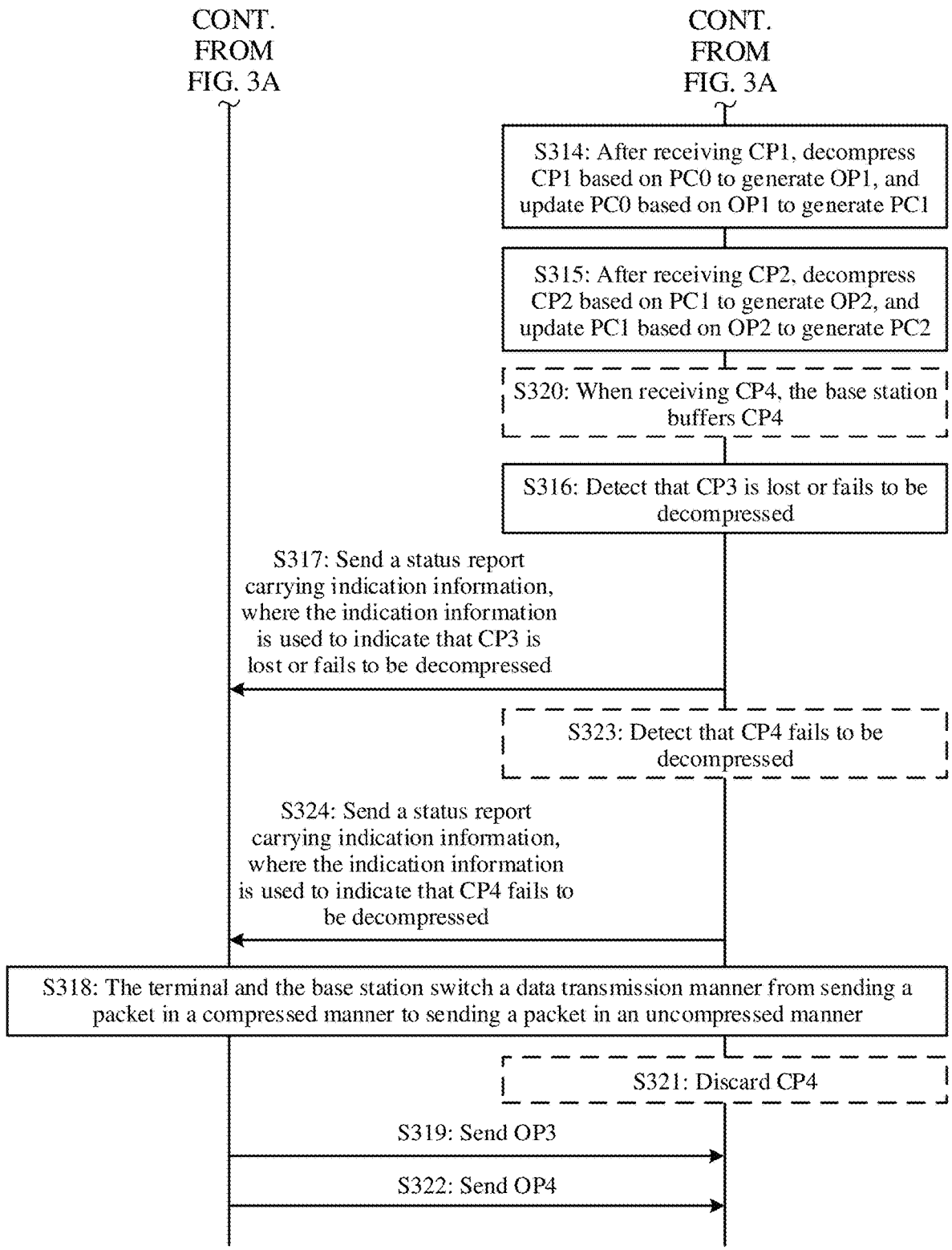

FIG. 3A and FIG. 3B are a schematic interaction flowchart 2 of a data transmission method according to this application. As shown in FIG. 3A and FIG. 3B, when the terminal and the base station switch a data transmission manner from sending a packet in a compressed manner to sending a packet in an uncompressed manner, this embodiment of this application may include the following operations.

S301: The terminal and the base station negotiate to enable the compressed manner to send a packet.

S302: The terminal compresses OP1 based on a preset compression parameter PC0 to generate CP1, and updates PC0 based on OP1 to generate PC1.

S303: The terminal compresses OP2 based on PC1 to generate CP2, and updates PC1 based on OP2 to generate PC2.

S304: The terminal compresses OP3 based on PC2 to generate CP3, and updates PC2 based on OP3 to generate PC3.

S305: The terminal compresses OP4 based on PC3 to generate CP4, and updates PC3 based on OP4 to generate PC4.

S306: The terminal sends CP1 to the base station.

S307: The terminal buffers OP1 and CP1.

S308: The terminal sends CP2 to the base station.

S309: The terminal buffers OP2 and CP2.

S310: The terminal sends CP3 to the base station.

S311: The terminal buffers OP3 and CP3.

S312: The terminal sends CP4 to the base station.

S313: The terminal buffers OP4 and CP4.

S314: After receiving CP1, the base station decompresses CP1 based on PC0 to generate OP1, and updates PC0 based on OP1 to generate PC1.

S315: After receiving CP2, the base station decompresses CP2 based on PC1 to generate OP2, and updates PC1 based on OP2 to generate PC2.

S316: The base station detects that CP3 is lost or fails to be decompressed.

S317: The base station sends, to the terminal, a status report carrying indication information, where the indication information is used to indicate that CP3 is lost or fails to be decompressed.

The status report may include a sequence number of the compressed packet CP3.

S318: The terminal and the base station switch the data transmission manner from sending a packet in a compressed manner to sending a packet in an uncompressed manner.

It should be noted that operation S318 may be performed before operation S316, or may be performed after operation S316.

In an embodiment, operation S319 may be included after S318.

S319: The terminal sends OP3 to the base station.

The terminal may read buffered OP3.

In other words, after receiving the status report, the terminal may resend, to the base station, an original packet corresponding to the compressed packet indicated in the status report.

In an embodiment, operation S320 may be included before operation S317, and operation S321 may be further included after S317.

S320: The base station buffers CP4 when receiving CP4.

S321: The base station discards CP4.

In an embodiment, operation S322 may be further included after S319.

S322: The terminal sends OP4 to the base station.

In an embodiment, operation S323 and operation S324 are further included after operation S320. In this case, the terminal may perform operation S322 after receiving the status report sent in S324. It should be noted that operations S323 and S324 are not mandatory operations in this embodiment of this application.

S323: The base station detects that CP4 fails to be decompressed.

S324: The base station sends, to the terminal, a status report carrying indication information, where the indication information is used to indicate that CP4 fails to be decompressed.

It should be noted that operations S319, S320, S321, S322, S323, and S324 are not mandatory operations in this embodiment of this application.

In an embodiment, after receiving the status report, the terminal may resend, to the base station, an original packet corresponding to the compressed packet indicated in the status report, or may resend, to the base station, an original packet corresponding to a compressed packet that is compressed after the compressed packet indicated in the status report. If a compressed packet CP3 indicated in the status report sent by the terminal to the base station corresponds to an original packet OP3, that the upper layer is triggered to resend OP3 can be avoided. If a compressed packet CP4 following CP3 sent by the terminal to the base station corresponds to an original packet OP4, that the upper layer is triggered to resend OP4 can be avoided. In other words, when the terminal sends either or both of original packets of OP3 and OP4, a quantity of times of triggering retransmission at the upper layer can be reduced, thereby improving transmission efficiency that exists when a compressed packet is lost or fails to be decompressed.

Based on the method shown in FIG. 3A and FIG. 3B, when the terminal and the base station switch the data transmission manner from sending a packet to a source base station in a compressed manner to sending a packet to a target base station in an uncompressed manner, an embodiment of this application further provides a data transmission method.

Figure 4A:
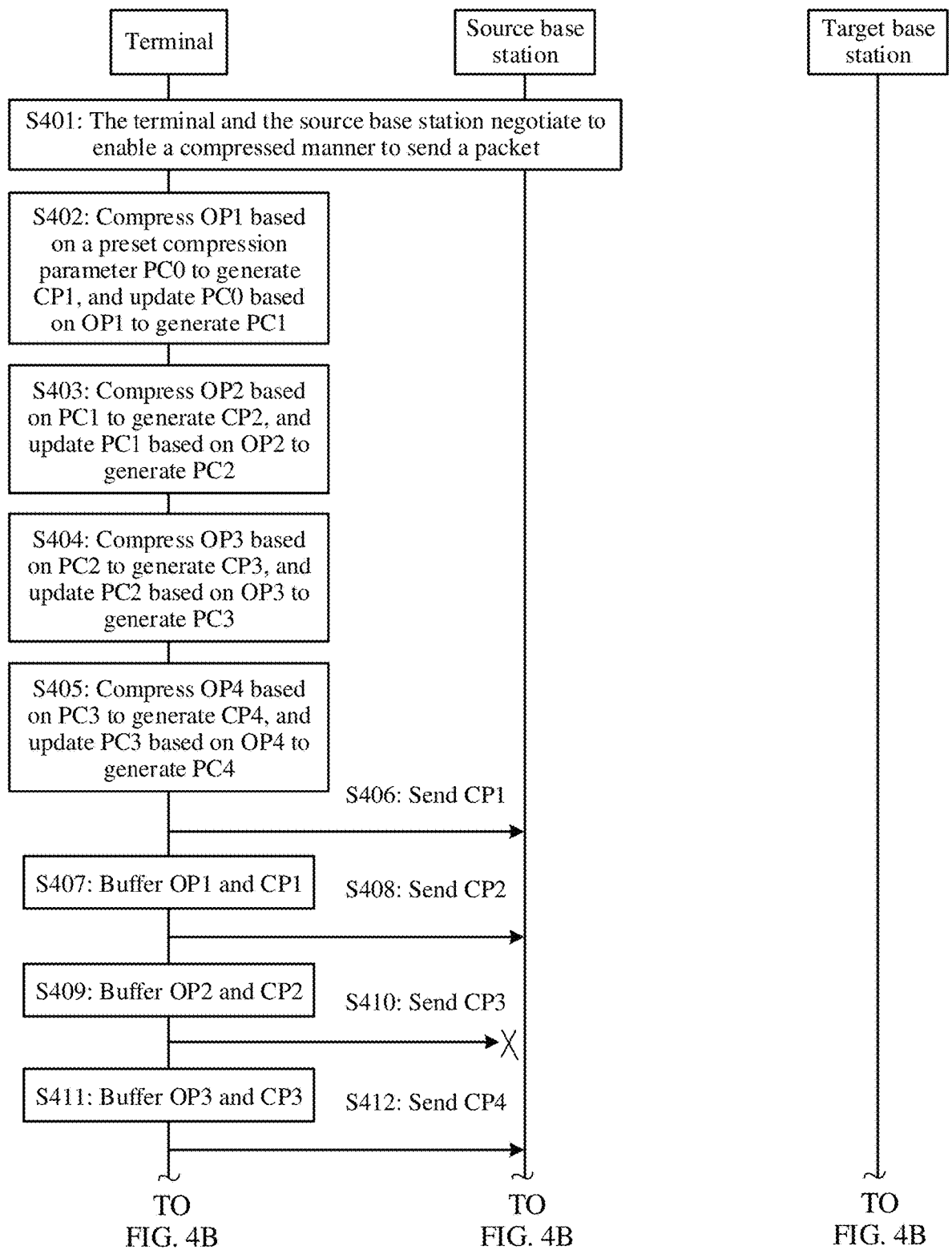
FIG. 4A and FIG. 4B are a schematic interaction flowchart 3 of a data transmission method according to this application.
Figure 4B:
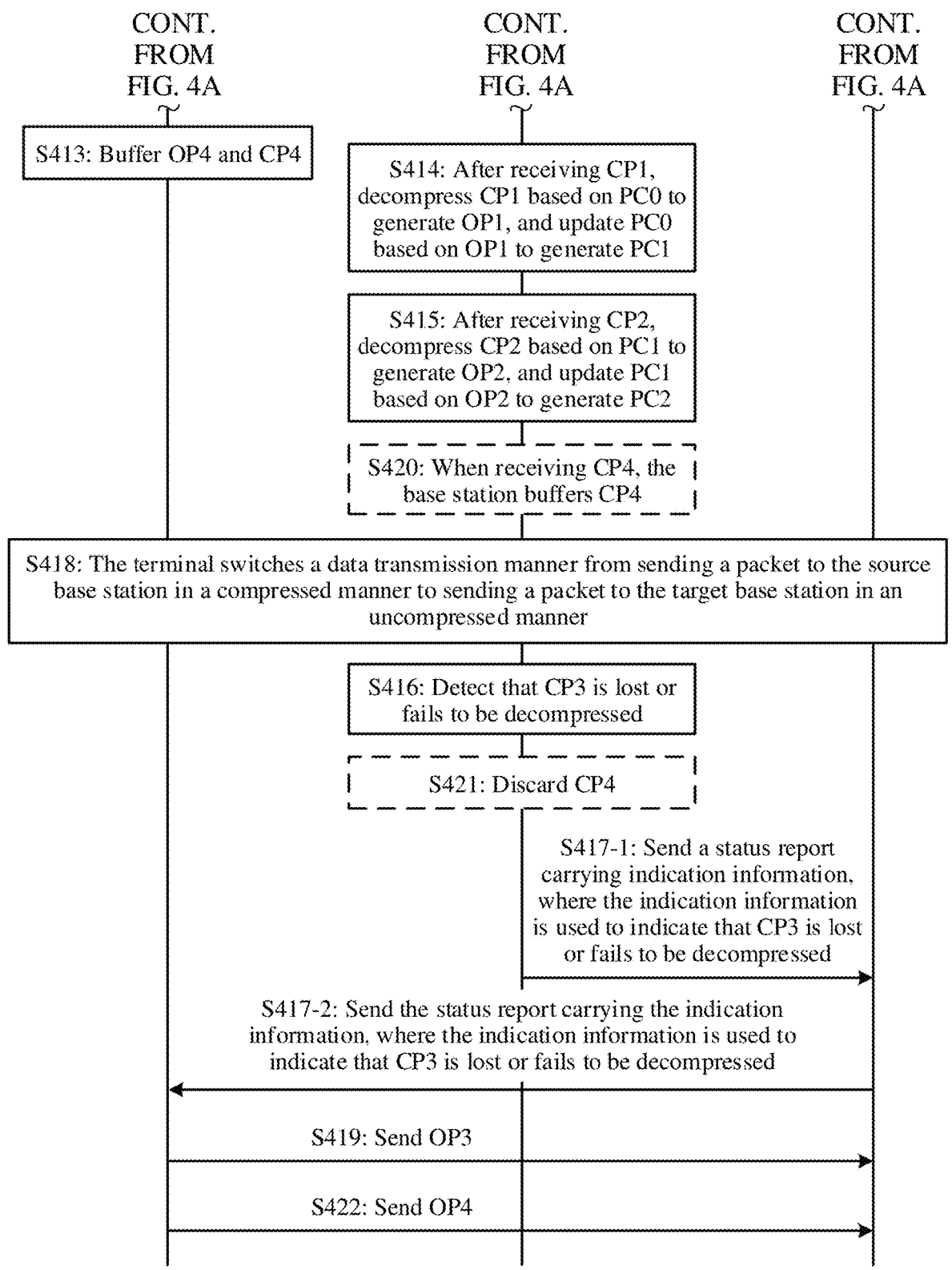

FIG. 4A and FIG. 4B are a schematic interaction flowchart 3 of a data transmission method according to this application.

As shown in FIG. 4A and FIG. 4B, the method according to this embodiment of this application may be performed by a terminal, a source base station, and a target base station. This embodiment of this application may include the following operations.

S401: The terminal and the source base station negotiate to enable a compressed manner to send a packet.

In this embodiment of this application, meanings of operations S401 to S416 are similar to those of operations S301 to S316 in FIG. 3A and FIG. 3B. For details, refer to related descriptions in the embodiment shown in FIG. 3A and FIG. 3B.

S402: The terminal compresses OP1 based on a preset compression parameter PC0 to generate CP1, and updates PC0 based on OP1 to generate PC1.

S403: The terminal compresses OP2 based on PC1 to generate CP2, and updates PC1 based on OP2 to generate PC2.

S404: The terminal compresses OP3 based on PC2 to generate CP3, and updates PC2 based on OP3 to generate PC3.

S405: The terminal compresses OP4 based on PC3 to generate CP4, and updates PC3 based on OP4 to generate PC4.

S406: The terminal sends CP1 to the source base station.

S407: The terminal buffers OP1 and CP1.

S408: The terminal sends CP2 to the source base station.

S409: The terminal buffers OP2 and CP2.

S410: The terminal sends CP3 to the source base station.

S411: The terminal buffers OP3 and CP3.

S412: The terminal sends CP4 to the source base station.

S413: The terminal buffers OP4 and CP4.

S414: After receiving CP1, the source base station decompresses CP1 based on PC0 to generate OP1, and updates PC0 based on OP1 to generate PC1.

S415: After receiving CP2, the source base station decompresses CP2 based on PC1 to generate OP2, and updates PC1 based on OP2 to generate PC2.

S416: The source base station detects that CP3 is lost or fails to be decompressed.

S417-1: The source base station sends, to the target base station, a status report carrying indication information, where the indication information is used to indicate that CP3 is lost or fails to be decompressed.

The status report may include a sequence number of the compressed packet CP3.

S417-2: The target base station sends, to the terminal, the status report carrying the indication information, where the indication information is used to indicate that CP3 is lost or fails to be decompressed.

S418: The terminal switches a data transmission manner from sending a packet to the source base station in a compressed manner to sending a packet to the target base station in an uncompressed manner.

It should be noted that operation S418 may be performed before operation S416, or may be performed after operation S416.

S419: The terminal sends OP3 to the target base station.

In other words, after receiving the status report, the terminal may resend, to the target base station, an original packet corresponding to the compressed packet indicated in the status report.

In an embodiment, operation S420 is further included before operation S417-1, and operation S421 may be further included after operation S417-1.

S420: The source base station buffers CP4 when receiving CP4.

S421: The source base station discards CP4.

It should be noted that meanings of operations S420 and S421 are similar to those of operations S320 and S321 in FIG. 3A and FIG. 3B.

In an embodiment, operation S422 may be further included after S419.

S422: The terminal sends OP4 to the target base station.

It should be noted that all the embodiments of this application may be applied to a lossless handover scenario. For example, in an application scenario of the embodiments of this application, when a mobile terminal is handed over among a plurality of base stations, in most cases, a data packet is lost during a handover process, causing a throughput decrease. To avoid a data packet loss, a mobile lossless handover technology is defined in the 3GPP protocol. The technology enables the terminal to retransmit a data packet that fails to be transmitted, so as to avoid a loss of an upper-layer application data packet. However, retransmission of the data packet may decrease the transmission efficiency. According to the data transmission method provided in the embodiments of this application, transmission efficiency that exists when a packet is lost or fails to be decompressed can be effectively improved.

For details and technical effects of other technical solutions in the embodiments of this application, refer to descriptions in other embodiments of this application.

Embodiment 3

Figure 5A:
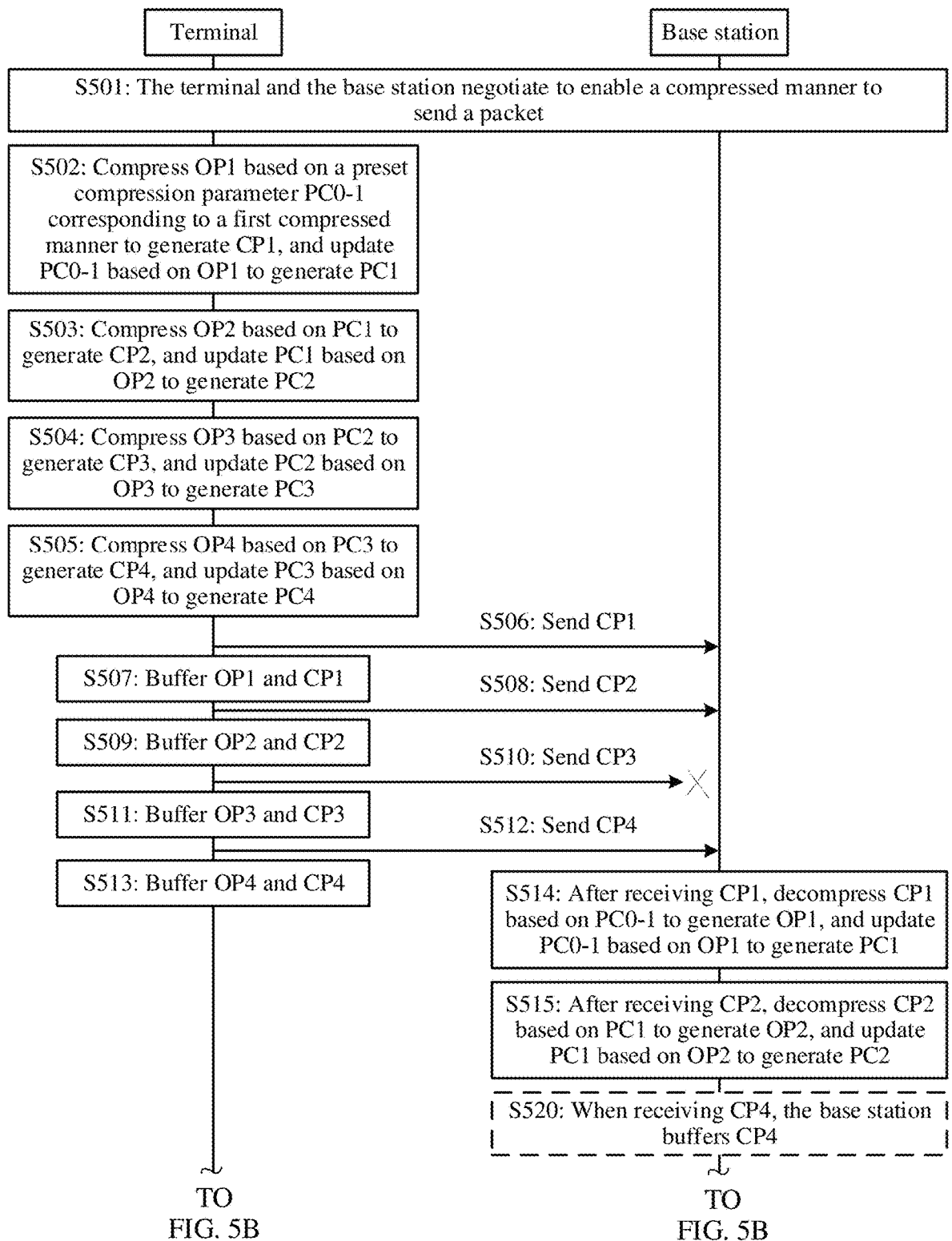
FIG. 5A and FIG. 5B are a schematic interaction flowchart 4 of a data transmission method according to this application.
Figure 5B:
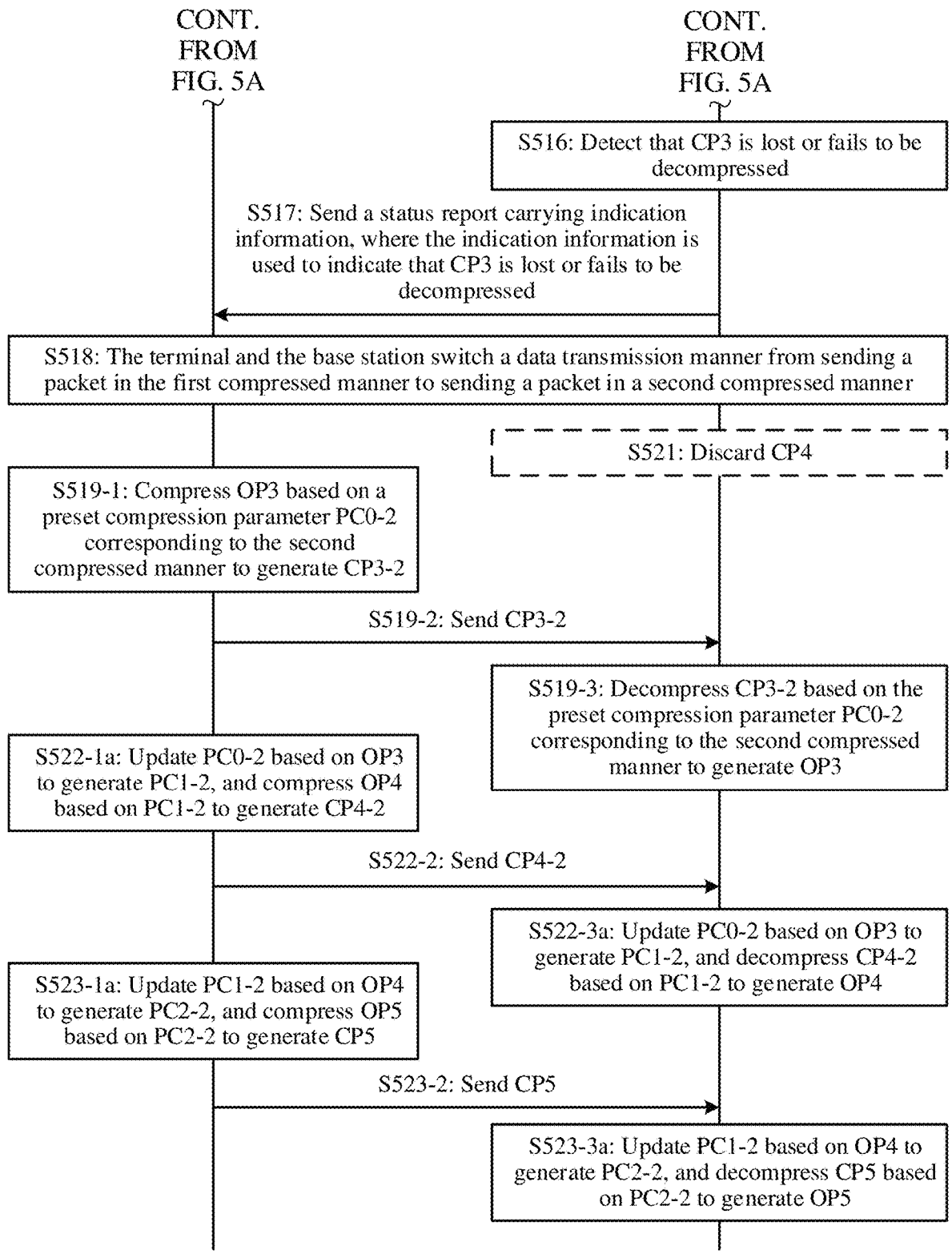

FIG. 5A and FIG. 5B are a schematic interaction flowchart 4 of a data transmission method according to this application.

As shown in FIG. 5A and FIG. 5B, when a terminal and a base station switch a data transmission manner from sending a packet in a first compressed manner to sending a packet in a second compressed manner, this embodiment of this application may include the following operations.

S501: The terminal and the base station negotiate to enable a compressed manner to send a packet.

In an embodiment, meanings of operations S501 to S516 are similar to those of operations S301 to S316 in FIG. 3A and FIG. 3B. For details, refer to related descriptions in the embodiment shown in FIG. 3A and FIG. 3B.

S502: The terminal compresses OP1 based on a preset compression parameter PC0-1 corresponding to the first compressed manner to generate CP1, and updates PC0-1 based on OP1 to generate PC1.

S503: The terminal compresses OP2 based on PC1 to generate CP2, and updates PC1 based on OP2 to generate PC2.

S504: The terminal compresses OP3 based on PC2 to generate CP3, and updates PC2 based on OP3 to generate PC3.

S505: The terminal compresses OP4 based on PC3 to generate CP4, and updates PC3 based on OP4 to generate PC4.

S506: The terminal sends CP1 to the base station.

S507: The terminal buffers OP1 and CP1.

S508: The terminal sends CP2 to the base station.

S509: The terminal buffers OP2 and CP2.

S510: The terminal sends CP3 to the base station.

S511: The terminal buffers OP3 and CP3.

S512: The terminal sends CP4 to the base station.

S513: The terminal buffers OP4 and CP4.

S514: The base station receives CP1, decompresses CP1 based on PC0-1 to generate OP1, and updates PC0-1 based on OP1 to generate PC1.

S515: The base station receives CP2, decompresses CP2 based on PC1 to generate OP2, and updates PC1 based on OP2 to generate PC2.

S516: The base station detects that CP3 is lost or fails to be decompressed.

S517: The base station sends, to the terminal, a status report carrying indication information, where the indication information is used to indicate that CP3 is lost or fails to be decompressed.

The status report may include a sequence number of the compressed packet CP3.

S518: The terminal and the base station switch the data transmission manner from sending a packet in the first compressed manner to sending a packet in a second compressed manner.

It should be noted that operation S518 may be performed before operation S516, or may be performed after operation S516.

S519-1: The terminal compresses OP3 based on a preset compression parameter PC0-2 corresponding to the second compressed manner to generate CP3-2.

S519-2: The terminal sends CP3-2 to the base station.

In other words, after receiving the status report, the terminal may compress, based on a preset compression parameter corresponding to a compressed manner that exists after the data transmission manner is switched, an original packet corresponding to the compressed packet indicated in the status report.

S519-3: The base station decompresses CP3-2 based on the preset compression parameter PC0-2 corresponding to the second compressed manner to generate OP3.

In an embodiment, operation S520 may be included before operation S517, and operation S521 may be further included after S517.

S520: The base station buffers CP4 when receiving CP4.

S521: The base station discards CP4.

In an embodiment, operations S522-1a and S522-2 may be further included after S519-1.

S522-1a: The terminal updates PC0-2 based on OP3 to generate PC1-2, and compresses OP4 based on PC1-2 to generate CP4-2.

S522-2: The terminal sends CP4-2 to the base station.

S522-3a: The base station updates PC0-2 based on OP3 to generate PC1-2, and decompresses CP4-2 based on PC1-2 to generate OP4.

In an embodiment, operations S523-1a, S523-2, and S523-2a may be further included after S522-3a.

S523-1a: The terminal updates PC1-2 based on OP4 to generate PC2-2, and compresses OP5 based on PC2-2 to generate CP5.

S523-2: The terminal sends CP5 to the base station.

S523-3a: The base station updates PC1-2 based on OP4 to generate PC2-2, and decompresses CP5 based on PC2-2 to generate OP5.

Table 4A is an example of a packet according to an embodiment of this application. As shown in Table 4A, a relationship between packets in operations S519-1, S519-2, S522-1a, S522-2, S522-1a, S522-3a, S523-1a, and S523-3a may be, for example, as follows:

TABLE 4A

| | | | |
|---|---|---|---|
| Original packet obtained before the data transmission manner is switched | OP3 | OP4 | |
| Compressed packet compressed before the data transmission manner is switched | CP3 | CP4 | |
| Original packet obtained after the data transmission manner is switched | | | OP5 |
| Compressed packet compressed after the data transmission manner is switched | CP3-2 | CP4-2 | CP5 |
| Compression parameter used to generate a compressed packet | PC0-2 | PC1-2 | PC2-2 |

TABLE 4A-continued

| Generation manner of the compression parameter | Obtained through negotiation in advance | Generated by updating PC0-2 based on OP3 | Generated by updating PC1-2 based on OP4 |
|---|---|---|---|

In an embodiment, it should be noted that the first compressed manner may be the same as the second compressed manner. In other words, the preset compression parameter PC0-1 corresponding to the first compressed manner may be the same as the preset compression parameter PC-2 corresponding to the second compressed manner. In this way, for the terminal, it is equivalent to re-entering a state in which the first compressed manner is used, that is, restarting a state by enabling a compressed manner.

In the foregoing manner, the terminal compresses, by using a preset compression parameter corresponding to the compressed manner that exists after the transmission manner is switched, a first to-be-resent packet OP3 that exists after the transmission manner is switched, and sequentially compresses, based on a compression parameter corresponding to a compressed packet compressed earlier, an original packet processed later. In addition, the original packet OP5 obtained after the transmission manner is switched is compressed based on a compression parameter corresponding to CP4-2 compressed before OP5. In this way, the base station can sequentially perform decompression processing on the compressed packet received after the data transmission manner is switched, in other words, decompress, based on the preset compression parameter, a first to-be-decompressed compressed packet that exists after the data transmission manner is switched, and sequentially decompress, based on the compression parameter corresponding to the compressed packet decompressed earlier, the compressed packet processed later.

Figure 5C:
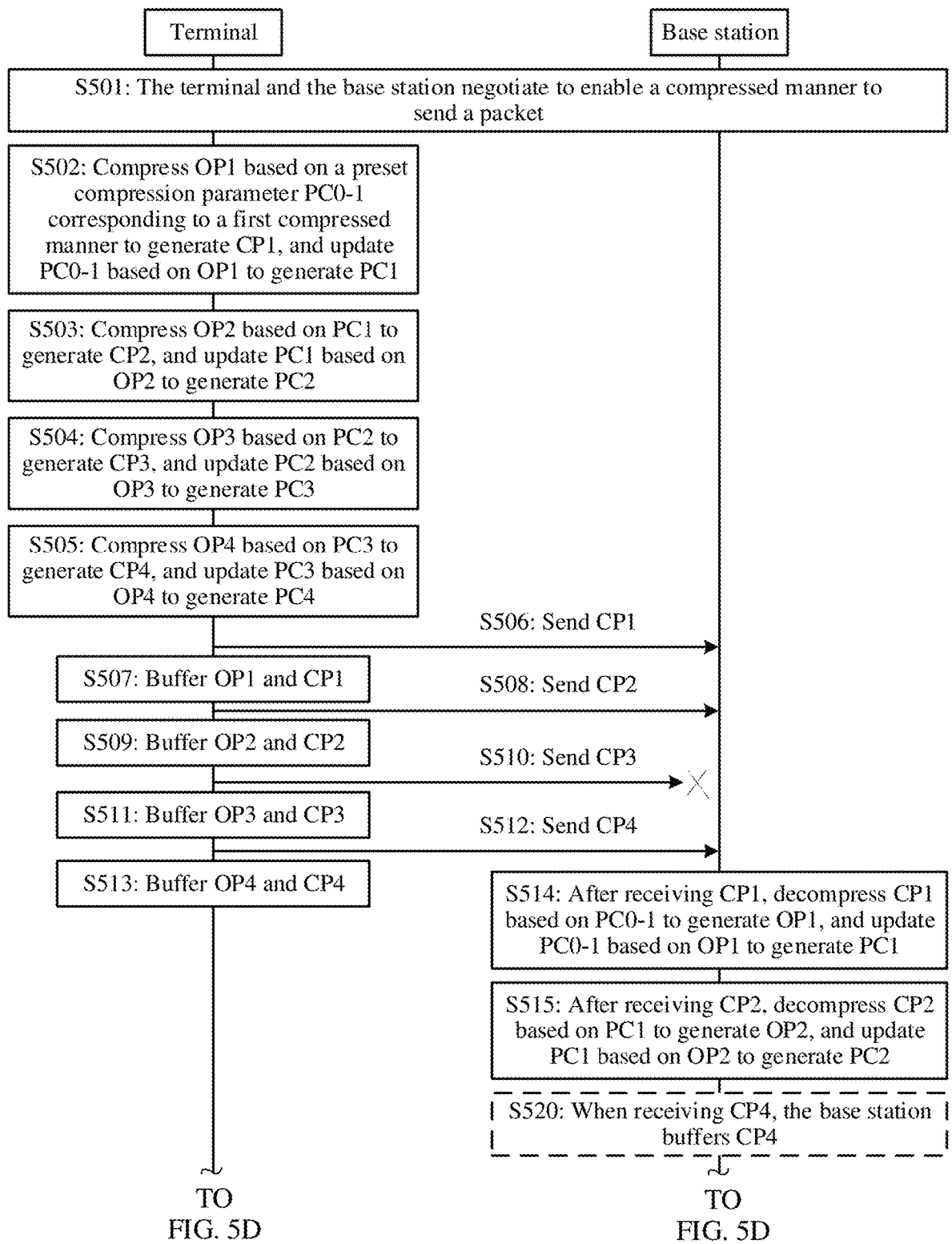
FIG. 5C and FIG. 5D are a schematic interaction flowchart 5 of a data transmission method according to this application.
Figure 5D:
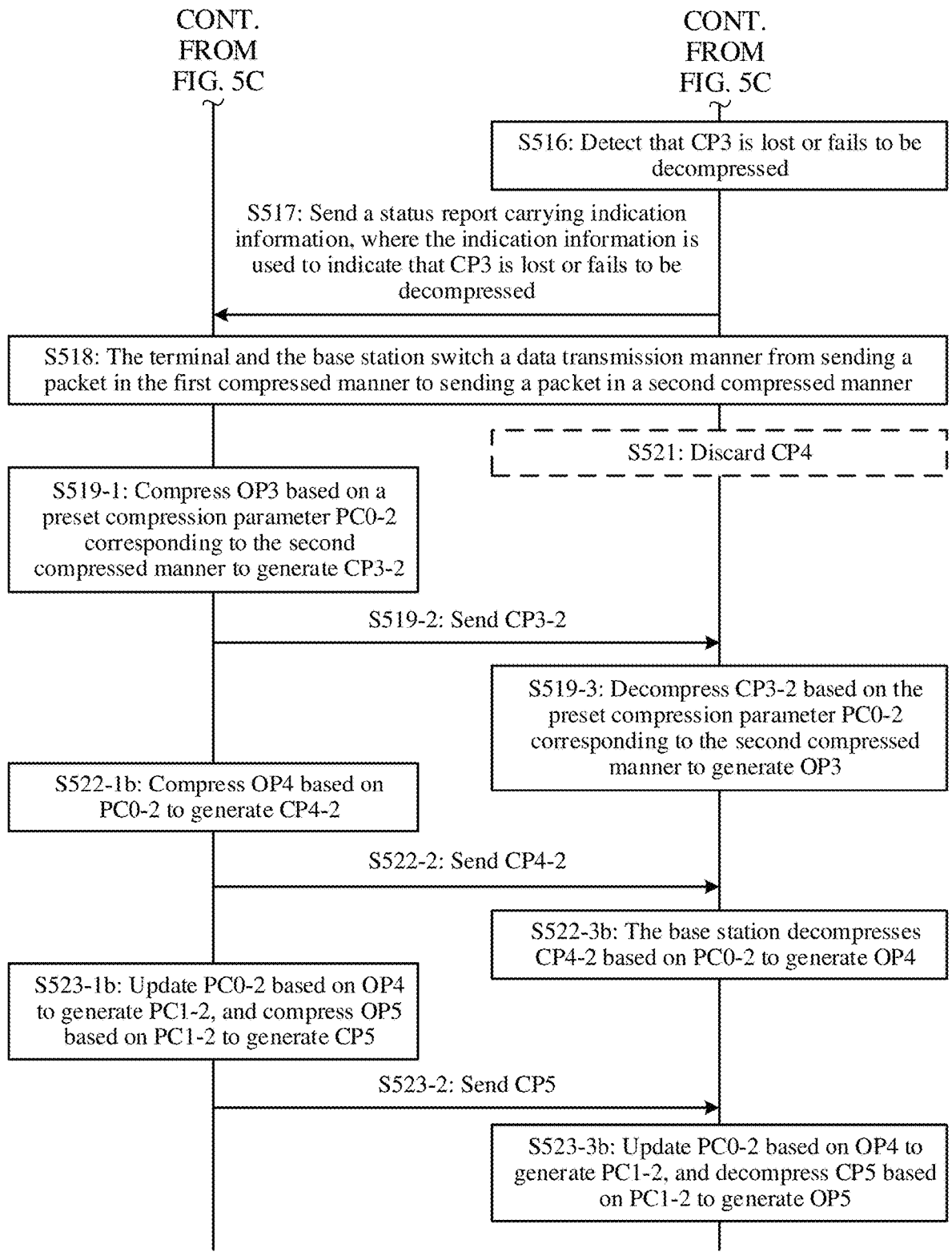

FIG. 5C and FIG. 5D are a schematic interaction flowchart 5 of a data transmission method according to this application. When a terminal and a base station switch a data transmission manner from sending a packet to in a first compressed manner to sending a packet in a second compressed manner, an embodiment of this application further provides a data transmission method.

S522-1a in FIG. 5A and FIG. 5B may also use S522-1b in FIG. 5C and FIG. 5D as an alternative manner. S522-3a in FIG. 5A and FIG. 5B may also use S522-3b in FIG. 5C and FIG. 5D as an alternative manner.

S522-1b: The terminal compresses OP4 based on PC0-2 to generate CP4-2.

S522-3b: The base station decompresses CP4-2 based on PC0-2 to generate OP4.

In addition, S523-1a in FIG. 5A and FIG. 5B may also use S523-1b in FIG. 5C and FIG. 5D as an alternative manner. S523-3a in FIG. 5A and FIG. 5B may also use S523-3b in FIG. 5C and FIG. 5D as an alternative manner.

S523-1b: The terminal updates PC0-2 based on OP4 to generate PC1-2, and compresses OP5 based on PC1-2 to generate CP5.

S523-3b: The base station updates PC0-2 based on OP4 to generate PC1-2, and decompresses CP5 based on PC1-2 to generate OP5.

Table 4B is an example of a packet according to an embodiment of this application. As shown in Table 4B, a relationship between packets in operations S519-1, S519-2, S522-1b, S522-2, S522-3b, S523-1b, and S523-3b may be, for example, as follows:

TABLE 4A

| | | | |
|---|---|---|---|
| Original packet obtained before the data transmission manner is switched | OP3 | OP4 | |
| Compressed packet compressed before the data transmission manner is switched | CP3 | CP4 | |
| Original packet obtained after the data transmission manner is switched | | | OP5 |
| Compressed packet compressed after the data transmission manner is switched | CP3-2 | CP4-2 | CP5 |
| Compression parameter used to generate a compressed packet | PC0-2 | PC0-2 | PC1-2 |
| Generation manner of the compression parameter | Obtained through negotiation in advance | Obtained through negotiation in advance | Generated by updating PC0-2 based on OP4 |

In the foregoing manner, the terminal may compress, by using a preset compression parameter corresponding to the compressed manner that exists after the transmission manner is switched, a plurality of packets that need to be resent after the transmission manner is switched, obtain, after the transmission manner is switched, a first original packet OP5 that needs to be compressed, and compress OP5 based on a compression parameter corresponding to the compressed packet CP4-2 compressed earlier.

Figure 5E:
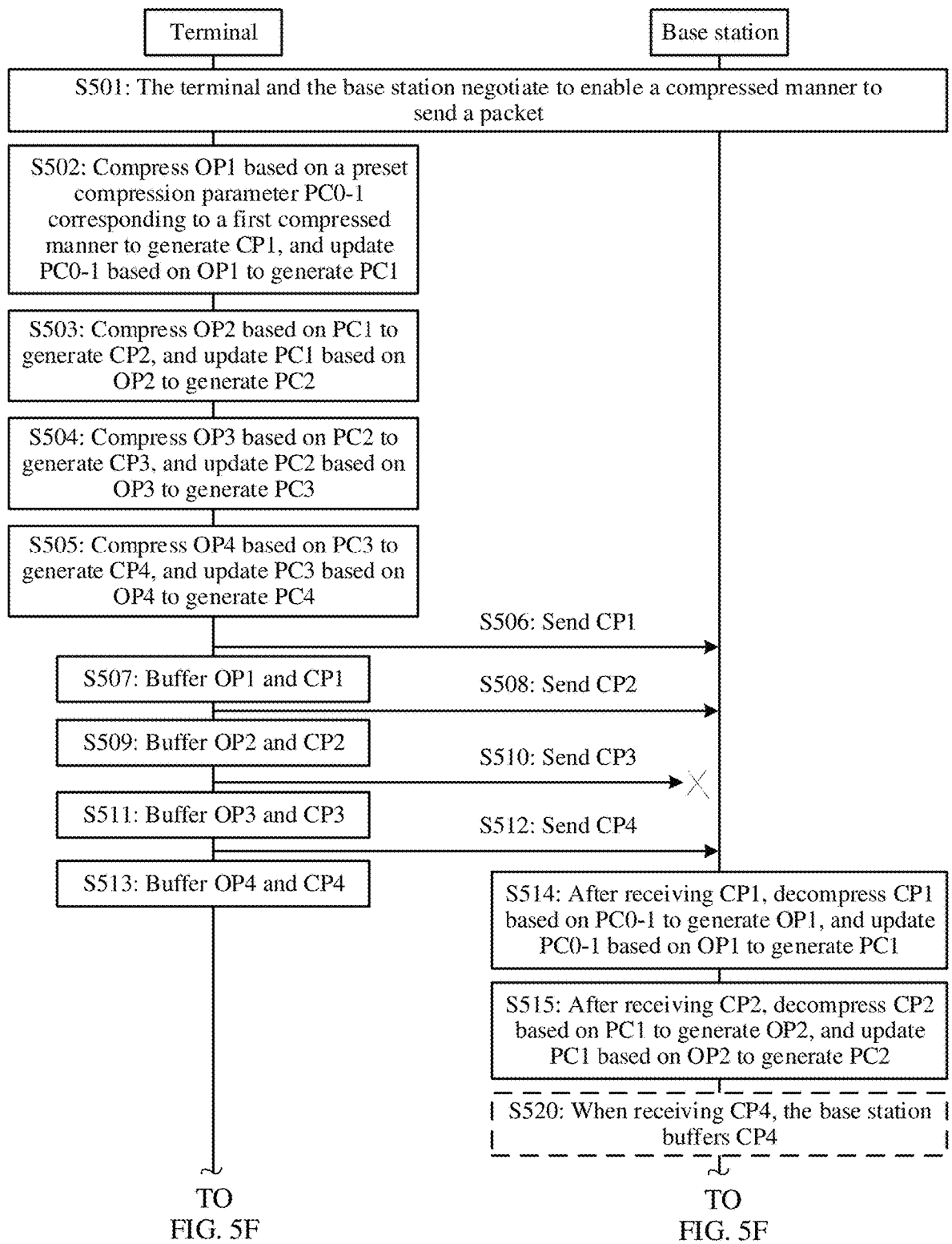
FIG. 5E and FIG. 5F are a schematic interaction flowchart 6 of a data transmission method according to this application.
Figure 5F:
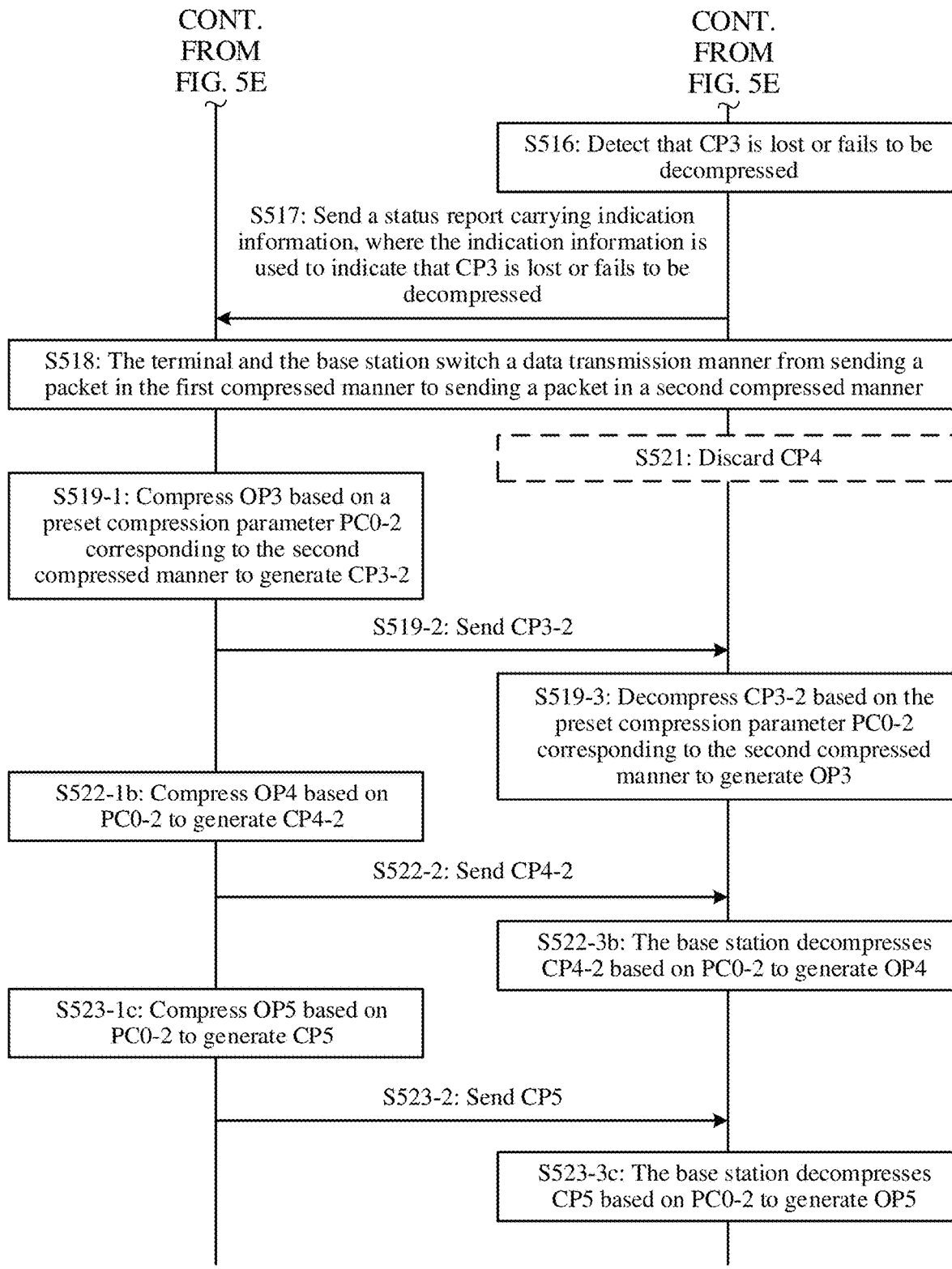

FIG. 5E and FIG. 5F are a schematic interaction flowchart 6 of a data transmission method according to this application. When a terminal and a base station switch a data transmission manner from sending a packet to in a first compressed manner to sending a packet in a second compressed manner, an embodiment of this application further provides another data transmission method.

S523-1b in FIG. 5C and FIG. 5D may also use S523-1c in FIG. 5E and FIG. 5F as an alternative manner. S523-3b in FIG. 5C and FIG. 5D may also use S523-3c in FIG. 5E and FIG. 5F as an alternative manner.

S523-1c: The terminal compresses OP5 based on PC0-2 to generate CP5.

S523-3c: The base station decompresses CP5 based on PC0-2 to generate OP5.

After S523-1c, the terminal may further update PC0-2 based on OP5 to generate PC1-2, compress OP6 based on PC1-2 to generate CP6, and send CP6 to the base station. Correspondingly, after obtaining OP6, the base station may update PC0-2 based on OP5 to generate PC1-2, and decompress CP6 based on PC1-2 to generate OP6.

Table 4C is an example of a packet according to an embodiment of this application. As shown in Table 4C, a relationship between packets in operations S519-1, S519-2, S522-1b, S522-2, S522-3b, S523-1c, and S523-3c may be, for example, as follows:

TABLE 4A

| | | | | |
|---|---|---|---|---|
| Original packet obtained before switching | OP3 | OP4 | | |
| Compressed packet compressed before switching | CP3 | CP4 | | |
| Original packet obtained after switching | | | OP5 | OP6 |
| Compressed packet compressed after switching | CP3-2 | CP4-2 | CP5 | CP6 |
| Compression parameter used to generate a compressed packet | PC0-2 | PC0-2 | PC0-2 | PC1-2 |
| Generation manner of the compression parameter | Obtained through negotiation in advance | Obtained through negotiation in advance | Obtained through negotiation in advance | Generated by updating PC0-2 based on OP5 |

Figure 6A:
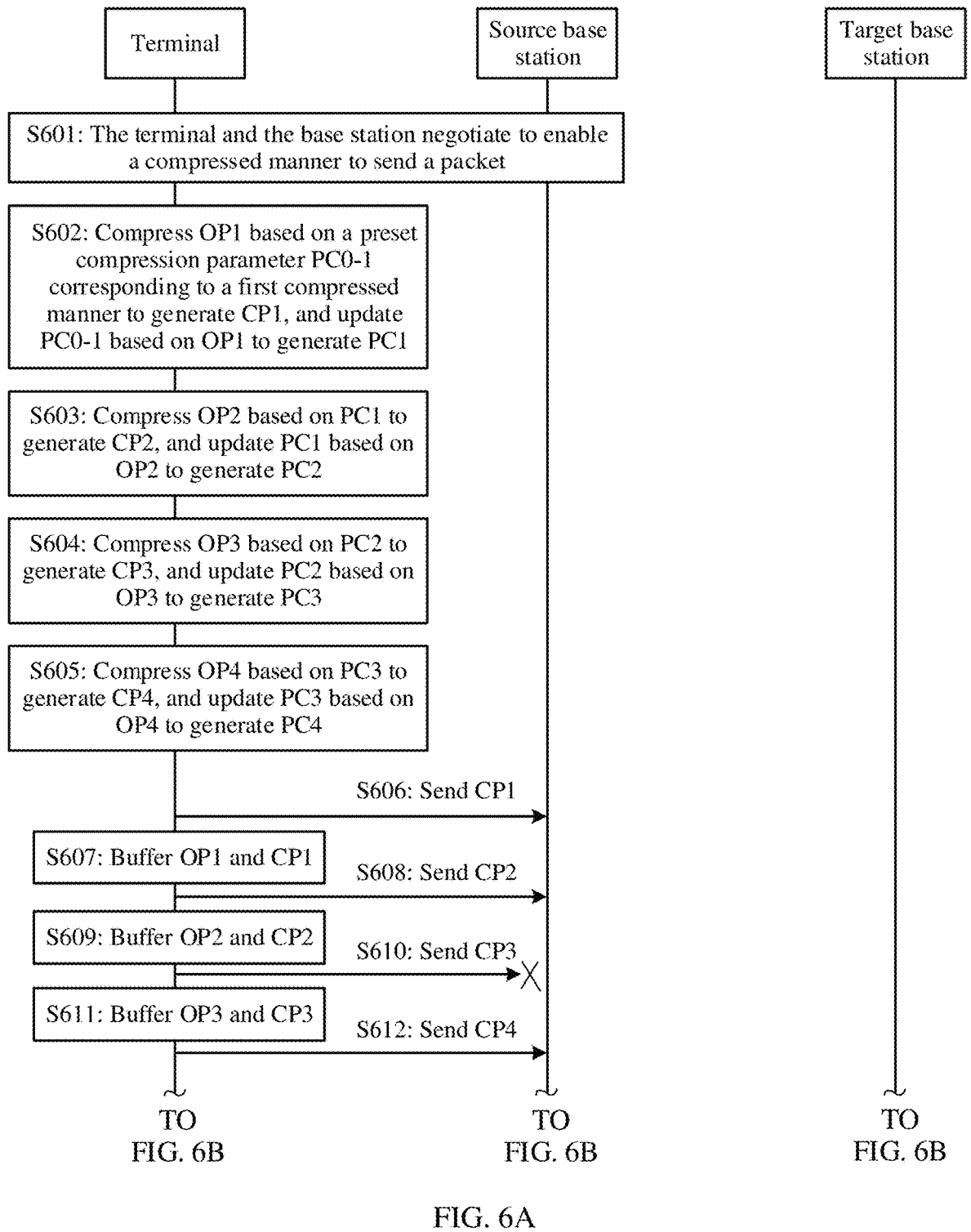
FIG. 6A, FIG. 6B, and FIG. 6C are a schematic interaction flowchart 7 of a data transmission method according to this application.
Figure 6B:
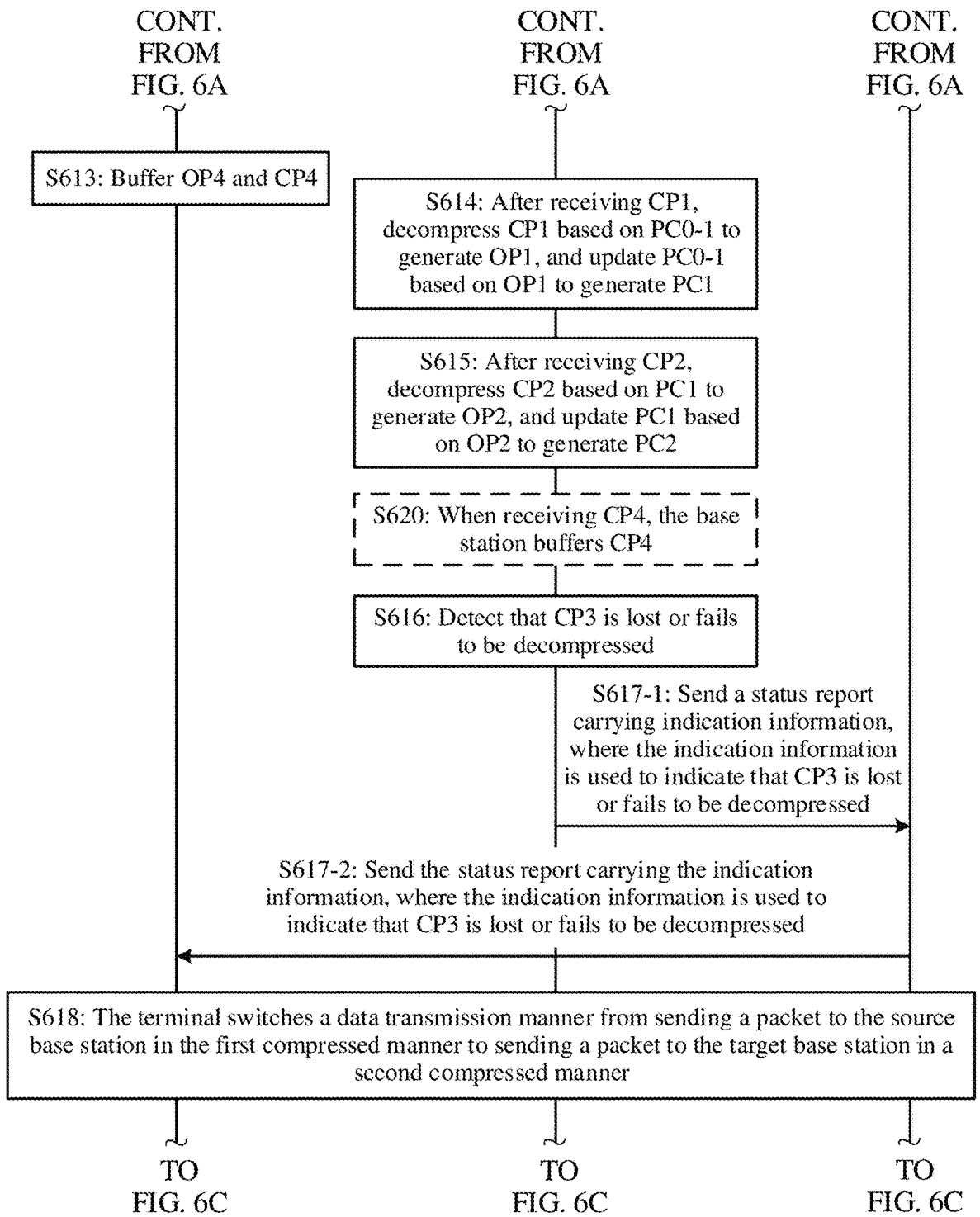
Figure 6C:
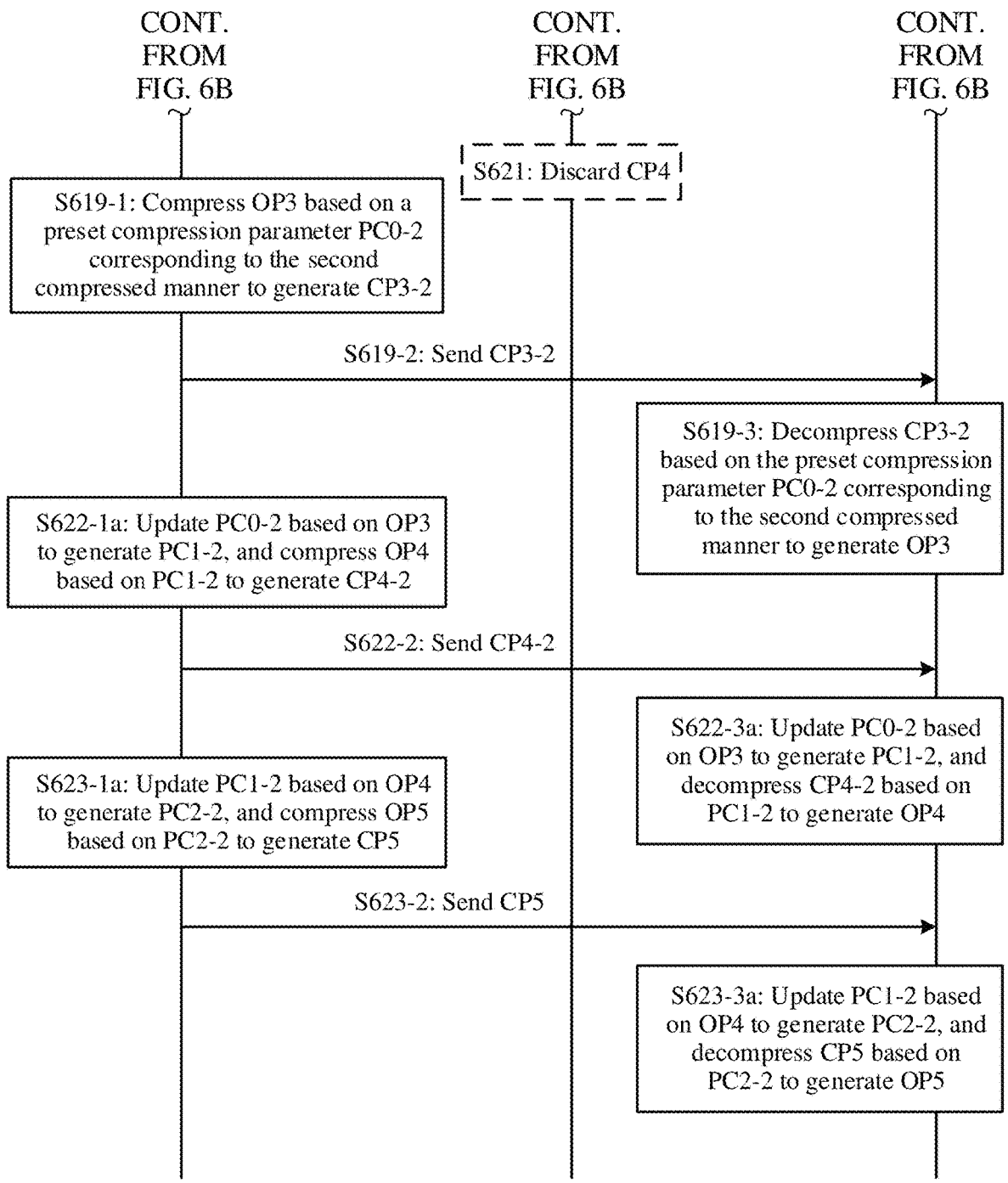

FIG. 6A, FIG. 6B, and FIG. 6C are a schematic interaction flowchart 7 of a data transmission method according to this application.

As shown in FIG. 6A, FIG. 6B, and FIG. 6C, when a terminal and a base station switch a data transmission manner from sending a packet to a source base station in a first compressed manner to sending a packet to a target base station in a second compressed manner, this embodiment of this application may include the following operations.

S601: The terminal and the source base station negotiate to enable a compressed manner to send a packet.

In an embodiment, meanings of operations S601 to S616 are similar to those of operations S301 to S316 in FIG. 3A and FIG. 3B. For details, refer to related descriptions in the embodiment shown in FIG. 3A and FIG. 3B.

S602: The terminal compresses OP1 based on a preset compression parameter PC0-1 corresponding to the first compressed manner to generate CP1, and updates PC0-1 based on OP1 to generate PC1.

S603: The terminal compresses OP2 based on PC1 to generate CP2, and updates PC1 based on OP2 to generate PC2.

S604: The terminal compresses OP3 based on PC2 to generate CP3, and updates PC2 based on OP3 to generate PC3.

S605: The terminal compresses OP4 based on PC3 to generate CP4, and updates PC3 based on OP4 to generate PC4.

S606: The terminal sends CP1 to the source base station.
S607: The terminal buffers OP1 and CP1.
S608: The terminal sends CP2 to the source base station.
S609: The terminal buffers OP2 and CP2.
S610: The terminal sends CP3 to the source base station.
S611: The terminal buffers OP3 and CP3.
S612: The terminal sends CP4 to the source base station.
S613: The terminal buffers OP4 and CP4.
S614: The source base station receives CP1, decompresses CP1 based on PC0-1 to generate OP1, and updates PC0-1 based on OP1 to generate PC1.

S615: The source base station receives CP2, decompresses CP2 based on PC1 to generate OP2, and updates PC1 based on OP2 to generate PC2.

S616: The source base station detects that CP3 is lost or fails to be decompressed.

S617-1: The source base station sends, to the target base station, a status report carrying indication information, where the indication information is used to indicate that CP3 is lost or fails to be decompressed.

The status report may include a sequence number of the compressed packet CP3.

S617-2: The target base station sends, to the terminal, the status report carrying the indication information, where the indication information is used to indicate that CP3 is lost or fails to be decompressed.

The source base station may notify, through the status report, the terminal that from the first packet that is not successfully received, all subsequent packets are not received, and the terminal needs to retransmit the packets.

S618: The terminal switches the data transmission manner from sending a packet to the source base station in a first compressed manner to sending a packet to the target base station in a second compressed manner.

It should be noted that operation S618 may be performed before operation S616, or may be performed after operation S616.

S619-1: The terminal compresses OP3 based on a preset compression parameter PC0-2 corresponding to the second compressed manner to generate CP3-2.

S619-2: The terminal sends CP3-2 to the target base station.

In other words, after receiving the status report, the terminal may compress, based on a preset compression parameter corresponding to a compressed manner that exists after the data transmission manner is switched, an original packet corresponding to the compressed packet indicated in the status report.

S619-3: The target base station decompresses CP3-2 based on the preset compression parameter PC0-2 corresponding to the second compressed manner to generate OP3.

In an embodiment, operation S620 may be included before operation S617, and operation S621 may be further included after S617.

S620: The source base station buffers CP4 when receiving CP4.

S621: The source base station discards CP4.

In another embodiment, operations S622-1c and S622-2 may be further included after S619-1.

S622-1a: The terminal updates PC0-2 based on OP3 to generate PC1-2, and compresses OP4 based on PC1-2 to generate CP4-2.

S622-2: The terminal sends CP4-2 to the target base station.

S622-3a: The target base station updates PC0-2 based on OP3 to generate PC1-2, and decompresses CP4-2 based on PC1-2 to generate OP4.

In still another embodiment, operations S623-1a, S623-2, and S623-2a may be further included after S622-3a.

S623-1a: The terminal updates PC1-2 based on OP4 to generate PC2-2, and compresses OP5 based on PC2-2 to generate CP5.

S623-2: The terminal sends CP5 to the target base station.

S623-3a: The target base station updates PC1-2 based on OP4 to generate PC2-2, and decompresses CP5 based on PC2-2 to generate OP5.

For a correspondence between packets in the embodiment shown in operation S601 to operation S623-3a, refer to Table 4A.

In an embodiment, when the terminal switches the data transmission manner from sending a packet to the source base station through a source cell to sending a packet to the target base station through a target cell, and the source base station corresponding to the source cell and the target base station corresponding to the target cell are a same base station, for example, an intra-base station handover is performed between different cells, the same base station may perform the method related to the source base station and the target base station in the foregoing embodiments.

Similarly, when the data transmission manner switched by the terminal is intra-cell handover, in other words, the cell before the handover and the cell after the handover are a same cell, a base station corresponding to the same cell may perform the method related to the source base station and the target base station in the foregoing embodiments. The intra-cell handover may also be used to modify cell parameters.

For details and technical effects of other technical solutions in the embodiments of this application, refer to descriptions in other embodiments of this application.

Embodiment 4

Figure 7:
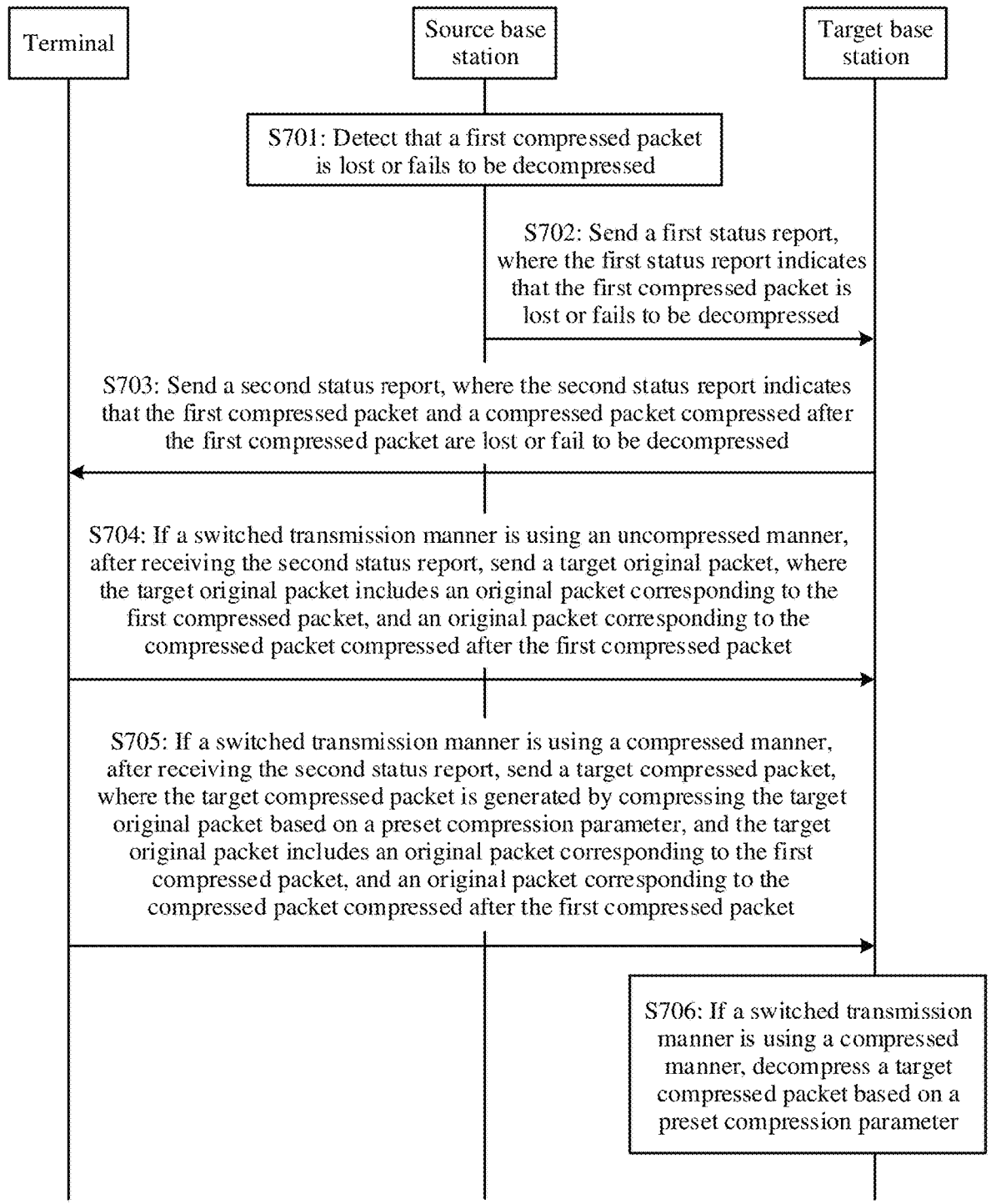
FIG. 7 is a schematic interaction flowchart 8 of a data transmission method according to this application.

FIG. 7 is a schematic interaction flowchart 8 of a data transmission method according to this application. Based on any one of the foregoing embodiments in which the terminal switches from sending a packet to the source base station to sending a packet to the target base station, the source base station and the target base station may further send a status report to the terminal in the following manner.

As shown in FIG. 7, this embodiment of this application may include the following operations.

S701: The source base station detects that a first compressed packet is lost or fails to be decompressed.

S702: The source base station sends a first status report to the target base station, where the first status report indicates that the first compressed packet is lost or fails to be decompressed.

S703: The target base station sends a second status report to the terminal, where the second status report indicates that the first compressed packet and a compressed packet compressed after the first compressed packet are lost or fail to be decompressed.

In an embodiment, the target base station may determine, based on an acknowledgment message sent by the source base station to the terminal through the target base station, a sequence number of a currently received compressed packet, and may determine, based on a sequence number of a compressed packet or an original packet received from the terminal, that is, a sequence number of a latest packet transmitted by the terminal, a sequence number of the compressed packet that is lost or fails to be decompressed after the first compressed packet. For example, if the lost compressed packet is CP3, and the compressed packet that may be sent by the terminal to the base station is CP5, the target base station may determine that CP4 is lost or fails to be decompressed.

S704: If a switched transmission manner is using an uncompressed manner, after the terminal receives the second status report, the terminal sends a target original packet, where the target original packet includes an original packet corresponding to the first compressed packet, and an original packet corresponding to a compressed packet compressed after the first compressed packet.

S705: If a switched transmission manner is using a compressed manner, after the terminal receives the second status report, the terminal sends a target compressed packet, where the target compressed packet is generated by compressing the target original packet based on a preset compression parameter, and the target original packet includes an original packet corresponding to the first compressed packet, and an original packet corresponding to a compressed packet compressed after the first compressed packet.

The terminal may send the target compressed packet based on the preset compression parameter in any compressed manner shown in Embodiment 4.

S706: If a switched transmission manner is using a compressed manner, the target base station decompresses a target compressed packet based on a preset compression parameter.

The base station may decompress the target compressed packet based on the preset compression parameter in a decompressed manner corresponding to the compressed manner used by the terminal in operation S705.

Embodiment 5

Figure 8:
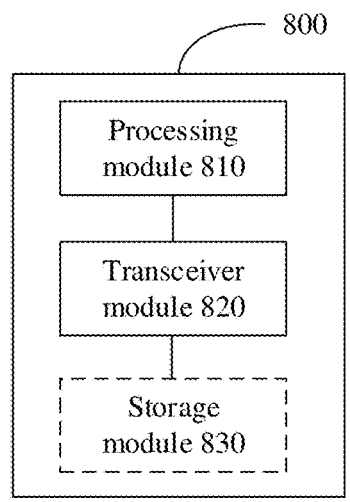
FIG. 8 is a schematic block diagram of an apparatus 800 that is on a transmit end side according to an embodiment of this application.

FIG. 8 is a schematic block diagram of an apparatus 800 that is on a transmit end side according to an embodiment of this application. In an embodiment, the apparatus 800 shown in FIG. 8 may correspond to the apparatus that is on the transmit end side in the foregoing method embodiment, and may have any function of the transmit end in the method. In an embodiment, the apparatus 800 in this embodiment of this application may be a transmit end, or may be a chip in a transmit end. The apparatus 800 may include a processing module 810 and a transceiver module 820. In an embodiment, the apparatus 800 may further include a storage module 830.

For example, the processing module 810 may be configured to perform operation S201 in the foregoing method embodiment.

The transceiver module 820 may be configured to receive signaling or data sent in operation S201 in the foregoing method embodiment, or perform operation S202; or may be configured to receive signaling or data sent in operation S417-2 in the foregoing method embodiment, or perform operation S419 and/or S422; or may be configured to receive signaling or data sent in operation S317 in the foregoing method embodiment, or perform operation S319 and/or S322; or may be configured to receive signaling or data sent in operation S517 in the foregoing method embodiment, or perform operations S519-1 and S519-2, or S522-1a and S522-2, or S523-1a and S523-2; or may be configured to receive signaling or data sent in operation S517 in the foregoing method embodiment, or perform operations S519-1 and S519-2, or S522-1*b* and S522-2, or S523-1*b* and S523-2; or may be configured to receive signaling or data sent in operation S517 in the foregoing method embodiment, or perform operations S519-1 and S519-2, or S522-1*c* and S522-2, or S523-1*c* and S523-2; or may be configured to receive signaling or data sent in operation S617-2 in the foregoing method embodiment, or perform operations S619-1 and S619-2, or S622-1*a* and S622-2, or S623-1*a* and S623-2; or may be configured to receive signaling or data sent in operation S703 in the foregoing method embodiment, or perform operation S704 or S705.

It should be understood that the apparatus 800 according to this embodiment of this application may correspond to the transmit end in the methods of the foregoing embodiments, and the foregoing and other management operations and/or functions of the modules in the apparatus 800 are intended to implement corresponding operations in the foregoing methods. For brevity, details are not described herein.

In an embodiment, the apparatus 800 may be configured as a universal processing system, which, for example, is usually referred to as a chip. The processing module 810 may include one or more processors that provide a processing function. The transceiver module 820 may be, for example, an input/output interface, a pin, or a circuit. The input/output interface may be configured to be responsible for information interaction between the chip system and the outside. For example, the input/output interface may output a scheduling request message that is input by another module outside the chip to the chip. The processing module may execute a computer executable instruction stored in the storage module, to implement the function of the transmit end in the foregoing method embodiment. In an example, the storage module 830 included in the apparatus 800 may be a storage unit in the chip, for example, a register or a buffer. The storage module 830 may be alternatively a storage unit that is located outside the chip, for example, a read-only memory (ROM), another type of static storage device that can store static information and an instruction, or a random access memory (RAM).

Figure 9:
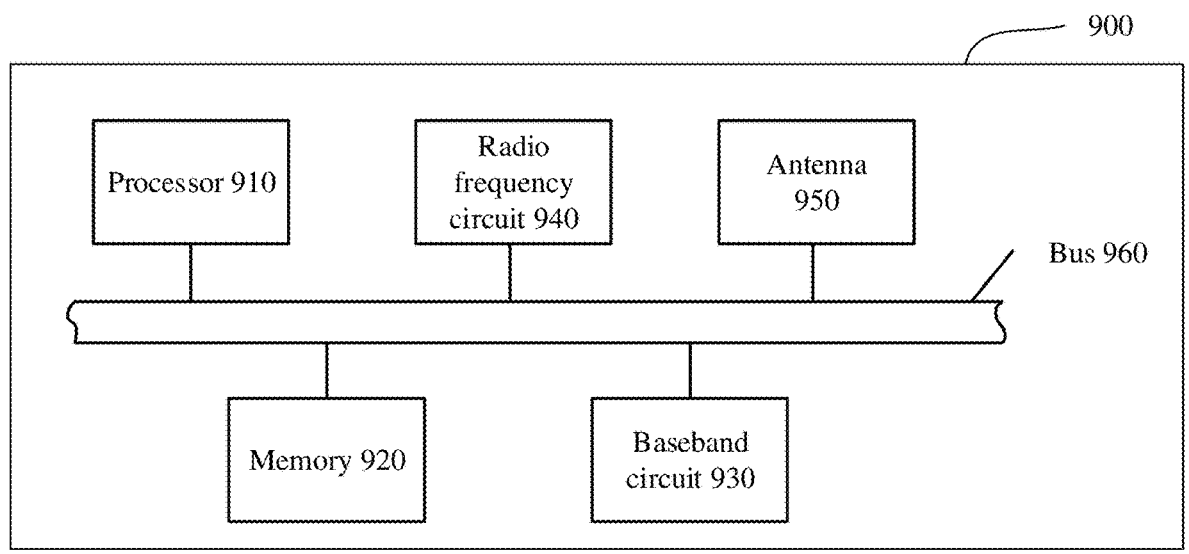
FIG. 9 is a schematic block diagram of another communications apparatus 900 that is on a transmit end side according to an embodiment of this application.

In an embodiment, FIG. 9 is a schematic block diagram of another communications apparatus 900 that is on a transmit end side according to an embodiment of this application. The apparatus 900 in this embodiment of this application may be the transmit end in the foregoing method embodiment, and the apparatus 900 may be configured to execute some or all functions of the transmit end in the foregoing method embodiment. The apparatus 900 may include a processor 910, a baseband circuit 930, a radio frequency circuit 940, and an antenna 950. In an embodiment, the apparatus 900 may further include a memory 920. Components of the apparatus 900 are coupled together by using a bus 960. In addition to a data bus, the bus system 960 includes a power bus, a control bus, and a status signal bus. However, for clear description, various types of buses in the figure are marked as the bus system 960.

The processor 910 may be configured to control the transmit end, and configured to perform processing performed by the transmit end in the foregoing embodiment. The processor 910 may perform a processing process related to the transmit end in the foregoing method embodiment and/or configured to perform another process of the technology described in this application. Further, the processor 910 may run an operating system, be responsible for managing the bus, and execute a program or an instruction stored in the memory.

The baseband circuit 930, the radio frequency circuit 940, and the antenna 950 may be configured to support information receiving and sending between the transmit end and the receive end or the station in the foregoing embodiment, to support wireless communication between the transmit end and another node. In an embodiment, a measurement result sent by the station is received through the antenna 950, processed by the radio frequency circuit 940 through processing such as filtering, amplification, down-conversion, and digitization, processed by the baseband circuit 930 through baseband processing such as decoding and protocol-based data decapsulation, and processed by the processor 910, to restore service data and signaling information that are sent by the station. In an embodiment, a station group setup feedback message sent by the transmit end may be processed by the processor 910, processed by the baseband circuit 99 through baseband processing such as protocol-based encapsulation and encoding, further processed by the radio frequency circuit 940 through radio frequency processing such as analog conversion, filtering, amplification, and up-conversion, and sent to a receive end device through the antenna 950.

The memory 920 may be configured to store program code and data of the transmit end, and the memory 920 may be the storage module 830 in FIG. 8. It can be understood that the baseband circuit 930, the radio frequency circuit 940, and the antenna 950 may be further configured to support communication between the transmit end and another network entity, for example, communication between the transmit end and a network element on a core network side. As shown in FIG. 9, the memory 920 is separated from the processor 910. However, a person skilled in the art very easily understands that the memory 920 or any part of the memory 920 may be located outside the apparatus 900. For example, the memory 920 may include a transmission cable and/or a computer product separated from a wireless node. The media may be accessed by the processor 910 through the bus interface 960. Alternatively, the memory 920 or any part thereof may be integrated into the processor 910, for example, may be a cache and/or a general purpose register.

It may be understood that, FIG. 9 shows only a simplified design of the transmit end. For example, the transmit end may include any quantity of transmitters, receivers, processors, memories, and the like, and all transmit ends that can implement the present disclosure fall within the protection scope of the present disclosure.

Figure 10:
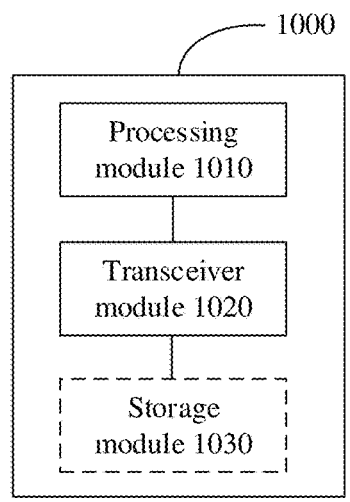
FIG. 10 is a schematic block diagram of an apparatus 1000 that is on a receive end side according to an embodiment of this application.

FIG. 10 is a schematic block diagram of an apparatus 1000 that is on a receive end side according to an embodiment of this application. In an embodiment, the apparatus 1000 shown in FIG. 10 may correspond to the apparatus that is on the receive end side in the foregoing method embodiment, and may have any function of the receive end in the method. In an embodiment, the apparatus 1000 in this embodiment of this application may be a receive end, or may be a chip in a receive end. The apparatus 1000 may include a processing module 1010 and a transceiver module 1020. In an embodiment, the apparatus 1000 may further include a storage module 1030.

For example, the processing module 1010 may be configured to perform operation S321 or S421 or S521 or S621 in the foregoing method embodiment, or configured to perform operation S316 or S323, or configured to perform operation S701.

The transceiver module 1020 may be configured to receive signaling or data sent in S202 in the foregoing method embodiment, or receive signaling or data sent in operation S319 or S322 in the foregoing method embodiment; or may be configured to receive signaling or data sent in operation S417-1 in the foregoing method embodiment, or perform operation S417-2, or receive signaling or data sent in operation S419 or S422; or may be configured to receive signaling or data sent in operation S519-2, or perform operation S519-3; or may be configured to receive signaling or data sent in operation S522-2, or perform operation S522-3a or S522-3b; or may be configured to receive signaling or data sent in operation S523-2, or perform operation S523-3a or S523-3b or S523-3c; or may be configured to receive signaling or data sent in operation S617-1, or perform operation S617-2; or configured to receive signaling or data sent in operation S619-2, or perform signaling or data sent in operation S619-3; or configured to receive signaling or data sent in operation S622-2, or perform signaling or data sent in operation S622-3a; or configured to receive signaling or data sent in operation S623-2, or perform signaling or data sent in operation S623-3a; or perform operation S702; or may be configured to receive signaling or data sent in operation S702 in the foregoing method embodiment, or perform S703; or may be configured to receive signaling or data sent in operation S704 or S705, or perform S706.

It should be understood that the apparatus 1000 according to this embodiment of this application may correspond to the receive end in the methods of the foregoing embodiments, and the foregoing and other management operations and/or functions of the modules in the apparatus 1000 are intended to implement corresponding operations in the foregoing methods. For brevity, details are not described herein.

In an embodiment, the apparatus 1000 may be configured as a universal processing system, which, for example, is usually referred to as a chip. The processing module 1010 may include one or more processors that provide a processing function. The transceiver module 1020 may be, for example, an input/output interface, a pin, or a circuit. The input/output interface may be configured to be responsible for information interaction between the chip system and the outside. For example, the input/output interface may output a scheduling request message that is input by another module outside the chip to the chip. The processing module may execute a computer executable instruction stored in the storage module, to implement the function of the receive end in the foregoing method embodiment. In an example, the storage module 1030 included in the apparatus 1000 may be a storage unit in the chip, for example, a register or a buffer. The storage module 1030 may be alternatively a storage unit that is located outside the chip, for example, a read-only memory (ROM), another type of static storage device that can store static information and an instruction, or a random access memory (RAM).

Figure 11:
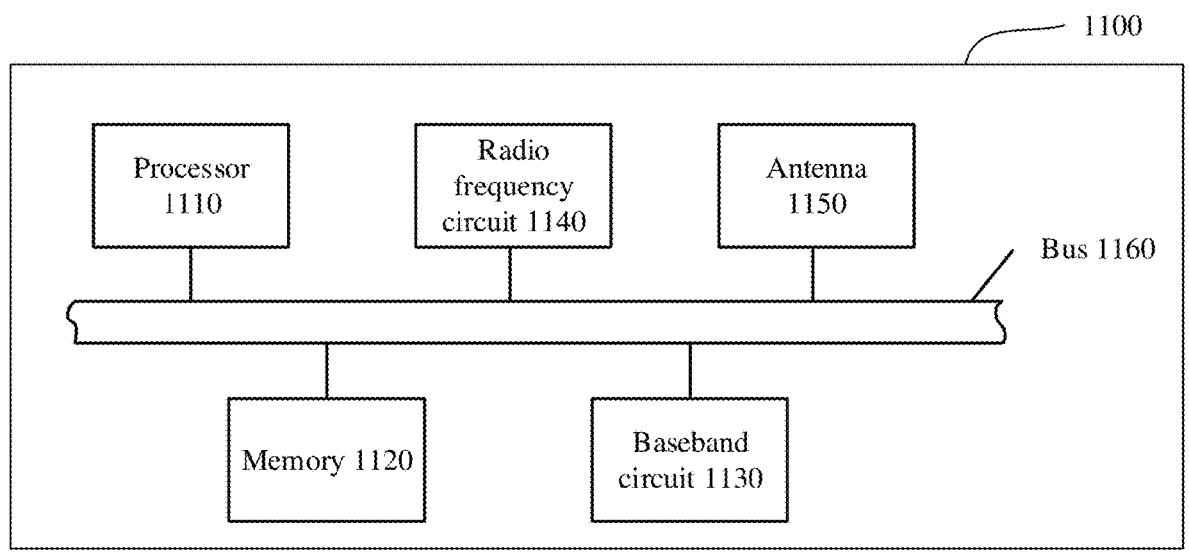
FIG. 11 is a schematic block diagram of another communications apparatus 1100 that is on a receive end side according to an embodiment of this application.

In an embodiment, FIG. 11 is a schematic block diagram of another communications apparatus 1100 that is on a receive end side according to an embodiment of this application. The apparatus 1100 in this embodiment of this application may be the receive end in the foregoing method embodiment, and the apparatus 1100 may be configured to execute some or all functions of the receive end in the foregoing method embodiment. The apparatus 1100 may include a processor 1110, a baseband circuit 1130, a radio frequency circuit 1140, and an antenna 1150. In an embodiment, the apparatus 1100 may further include a memory 1120. Components of the apparatus 1100 are coupled together by using a bus 1160. In addition to a data bus, the bus system 1160 includes a power bus, a control bus, and a status signal bus. However, for clear description, various types of buses in the figure are marked as the bus system 1160.

The processor 1110 may be configured to control the receive end, and configured to perform processing performed by the receive end in the foregoing embodiment. The processor 1110 may perform a processing process related to the receive end in the foregoing method embodiment and/or configured to perform another process of the technology described in this application. Further, the processor 1110 may run an operating system, be responsible for managing the bus, and execute a program or an instruction stored in the memory.

The baseband circuit 1130, the radio frequency circuit 1140, and the antenna 1150 may be configured to support information receiving and sending between the receive end and the transmit end or the station in the foregoing embodiment, to support wireless communication between the receive end and another node. In an example, a measurement result sent by the station is received through the antenna 1150, processed by the radio frequency circuit 1140 through processing such as filtering, amplification, down-conversion, and digitization, processed by the baseband circuit 1130 through baseband processing such as decoding and protocol-based data decapsulation, and processed by the processor 1110, to restore service data and signaling information that are sent by the station. In another example, a station group setup feedback message sent by the receive end may be processed by the processor 1110, processed by the baseband circuit 1111 through baseband processing such as protocol-based encapsulation and encoding, further processed by the radio frequency circuit 1140 through radio frequency processing such as analog conversion, filtering, amplification, and up-conversion, and sent to a transmit end device through the antenna 1150.

The memory 1120 may be configured to store program code and data of the receive end, and the memory 1120 may be the storage module 1030 in FIG. 10. It can be understood that the baseband circuit 1130, the radio frequency circuit 1140, and the antenna 1150 may be further configured to support communication between the receive end and another network entity, for example, communication between the receive end and a network element on a core network side. As shown in FIG. 11, the memory 1120 is separated from the processor 1110. However, a person skilled in the art very easily understands that the memory 1120 or any part of the memory 1120 may be located outside the apparatus 1100. For example, the memory 1120 may include a transmission cable and/or a computer product separated from a wireless node. The media may be accessed by the processor 1110 through the bus interface 1160. Alternatively, the memory 1120 or any part thereof may be integrated into the processor 1110, for example, may be a cache and/or a general purpose register.

It may be understood that, FIG. 11 shows only a simplified design of the receive end. For example, the receive end may include any quantity of transmitters, receivers, processors, memories, and the like, and all receive ends that can implement the present disclosure fall within the protection scope of the present disclosure.

An embodiment of this application further provides a computer storage medium. The computer-readable storage medium stores an instruction, and the instruction may be executed by one or more processors on a processing circuit. When the instruction is run on a computer, the computer is enabled to perform the method according to the foregoing aspects.

An embodiment of this application further provides a chip system. The chip system includes a processor, configured to support a distributed unit, a centralized unit, and a transmit end or a receive end to implement functions in the foregoing embodiments, for example, generating or processing data and/or information in the foregoing method.

In an embodiment, the chip system may further include a memory. The memory is configured to store a program instruction and data that are necessary to the distributed unit, the centralized unit, and the transmit end or the receive end. The chip system may include a chip, or may include a chip and another discrete device.

An embodiment of this application further provides a processor, configured to be coupled to a memory, and configured to perform the method and the function related to the transmit end device in any one of the foregoing embodiments.

An embodiment of this application further provides a processor, configured to be coupled to a memory, and configured to perform the method and the function related to the receive end in any one of the foregoing embodiments.

An embodiment of this application further provides a computer program product including an instruction. When the computer program product runs on a computer, the computer is enabled to perform the method and the function that are related to the transmit end device in any one of the foregoing embodiments.

An embodiment of this application further provides a computer program product including an instruction. When the computer program product runs on a computer, the computer is enabled to perform the method and the function that are related to the receive end in any one of the foregoing embodiments.

An embodiment of this application further provides a wireless communications system. The system includes the transmit end and at least one receive end in the foregoing embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. A data transmission method, comprising:
    obtaining, by a transmit end, indication information used to indicate that a first compressed packet is lost or fails to be decompressed, wherein the first compressed packet is generated by compressing a first original packet based on a first compression parameter and transmission of the first compressed packet is followed by transmission of a second compressed packet, wherein a second compression parameter used for generating the second compressed packet by compressing a second original packet is generated by updating based on the second original packet the first compression parameter used for generating the first compressed packet; and
    sending, by the transmit end, a target original packet or a target compressed packet generated by compressing the target original packet based on a preset compression parameter;
    wherein the target original packet comprises following packets: the first original packet corresponding to the first compressed packet, and the second original packet corresponding to the second compressed packet compressed after the first compressed packet, wherein the target compressed packet comprises:
        a third compressed packet generated by compressing the first original packet based on the preset compression parameter; and
        a fourth compressed packet generated by compressing the second original packet based on a compression parameter corresponding to the third compressed packet, wherein the compression parameter corresponding to the third compressed packet is generated by updating the preset compression parameter based on the first original packet.

2. The method according to claim 1, wherein in response to the transmit end switches from sending a packet in a compressed manner to sending a packet in an uncompressed manner,
    the sending, by the transmit end, a target original packet or a target compressed packet comprises: sending, by the transmit end, the target original packet.

3. The method according to claim 1, wherein in response to the transmit end switches from sending a packet in a first compressed manner to sending a packet in a second compressed manner, or the transmit end switches from sending a packet to a source receive end in a compressed manner to sending a packet to a target receive end in a compressed manner, or the transmit end enters a state of enabling the preset compression parameter to send a packet,
    the sending, by the transmit end, the target original packet or the target compressed packet comprises: sending, by the transmit end, the target compressed packet.

4. The method according to claim 1, further comprising:
    receiving, by a receive end, the target original packet or the target compressed packet sent by the transmit end.

5. The method according to claim 1, further comprising:
    when detecting that the first compressed packet sent by the transmit end is lost or fails to be decompressed, discarding, by a receive end, the second compressed packet that is sent after the first compressed packet.

6. The method according to claim 1, further comprising:
    receiving, by a target receive end, a first status report sent by a source receive end, wherein the first status report comprises indication information used to indicate that the first compressed packet is lost or fails to be decompressed; and sending, by the target receive end, a second status report to the transmit end, wherein the second status report comprises indication information used to indicate that the first compressed packet and the second compressed packet that is sent after the first compressed packet are lost or fail to be decompressed.

7. A data transmission apparatus, located on a transmit end side, the apparatus comprising:
a processor; and
a memory coupled to the processor to store instructions, which when executed by the processor, cause the processor to:
obtain indication information used to indicate that a first compressed packet is lost or fails to be decompressed, wherein the first compressed packet is generated by compressing a first original packet based on a first compression parameter and transmission of the first compressed packet is followed by transmission of a second compressed packet, wherein a second compression parameter used for generating the second compressed packet by compressing a second original packet is generated by updating based on the second original packet the first compression parameter used for generating the first compressed packet; and
send a target original packet or a target compressed packet generated by compressing the target original packet based on a preset compression parameter;
wherein the target original packet comprises following packets: the first original packet corresponding to the first compressed packet, and the second original packet corresponding to the second compressed packet compressed after the first compressed packet, wherein the target compressed packet comprises:
a third compressed packet generated by compressing the first original packet based on the preset compression parameter; and
a fourth compressed packet generated by compressing the second original packet based on a compression parameter corresponding to the third compressed packet, wherein the compression parameter corresponding to the third compressed packet is generated by updating the preset compression parameter based on the first original packet.

8. The apparatus according to claim 7, wherein in response to the transmit end switches from sending a packet in a compressed manner to sending a packet in an uncompressed manner,
the processor is to send the target original packet.

9. The apparatus according to claim 7, wherein in response to the transmit end switches from sending a packet in a first compressed manner to sending a packet in a second compressed manner, or the transmit end switches from sending a packet to a source receive end in a compressed manner to sending a packet to a target receive end in a compressed manner, or the transmit end enters a state of enabling the preset compression parameter to send a packet, the processor is to send the target compressed packet.

10. A data transmission apparatus, located on a receive end, the apparatus comprising:
a processor; and
a memory coupled to the processor to store instructions, which when executed by the processor, cause the processor to:
receive a target original packet or a target compressed packet sent by a transmit end, wherein the target compressed packet is generated by compressing the target original packet based on a preset compression parameter; and
wherein the target original packet comprises following packets: a first original packet corresponding to a first compressed packet, and a second original packet corresponding to a second compressed packet compressed after the first compressed packet, wherein the first compressed packet is generated by compressing the first original packet based on a first compression parameter and transmission of the first compressed packet is followed by transmission of the second compressed packet, wherein a second compression parameter used for generating the second compressed packet by compressing the second original packet is generated by updating based on the second original packet the first compression parameter used for generating the first compressed packet, wherein the target compressed packet comprises:
a third compressed packet generated by compressing the first original packet based on the preset compression parameter; and
a fourth compressed packet generated by compressing the second original packet based on a compression parameter corresponding to the third compressed packet, wherein the compression parameter corresponding to the third compressed packet is generated by updating the preset compression parameter based on the first original packet.

11. The data transmission apparatus of claim 10, wherein the processor is further to:
when detecting that the first compressed packet sent by the transmit end is lost or fails to be decompressed, discard the second compressed packet that is sent after the first compressed packet.

12. The data transmission apparatus of claim 10, wherein the processor is further to:
receive a first status report sent by the receive end, wherein the first status report comprises indication information used to indicate that the first compressed packet is lost or fails to be decompressed; and
send a second status report to the transmit end, wherein the second status report comprises indication information used to indicate that the first compressed packet and the second compressed packet that is sent after the first compressed packet are lost or fail to be decompressed.

13. The data transmission apparatus according to claim 10, wherein the processor is further caused to receive the target original packet or the target compressed packet.

* * * * *